(12) United States Patent
Lee

(10) Patent No.: US 10,367,978 B2
(45) Date of Patent: Jul. 30, 2019

(54) CAMERA SWITCHING METHOD AND ELECTRONIC DEVICE SUPPORTING THE SAME

(71) Applicant: Samsung Electronics Co., Ltd, Gyeonggi-do (KR)

(72) Inventor: Hwa Jun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/348,921

(22) Filed: Nov. 10, 2016

(65) Prior Publication Data

US 2017/0134623 A1    May 11, 2017

(30) Foreign Application Priority Data

Nov. 10, 2015  (KR) ......................... 10-2015-0157672

(51) Int. Cl.
| | | |
|---|---|---|
| *H04N 5/225* | (2006.01) | |
| *H04N 5/232* | (2006.01) | |
| *H04N 5/247* | (2006.01) | |

(52) U.S. Cl.
CPC ......... *H04N 5/2252* (2013.01); *H04N 5/2257* (2013.01); *H04N 5/23212* (2013.01); *H04N 5/23222* (2013.01); *H04N 5/23293* (2013.01); *H04N 5/247* (2013.01)

(58) Field of Classification Search
CPC ............. H04N 5/2252; H04N 5/23293; H04N 5/23222; H04N 5/247; H04N 5/2257; H04N 5/23212
USPC ....................................... 348/333.01–333.08
See application file for complete search history.

(56) References Cited

U.S. PATENT DOCUMENTS

| | | |
|---|---|---|
| 9,294,666 B2 | 3/2016 | Oshima et al. |
| 9,413,460 B2 | 8/2016 | Oshima et al. |
| 2012/0072167 A1* | 3/2012 | Cretella, Jr. .......... G06F 1/1626 702/150 |
| 2014/0333831 A1* | 11/2014 | Oh ....................... H04N 5/2254 348/376 |
| 2015/0189149 A1 | 7/2015 | Oshima et al. |

(Continued)

FOREIGN PATENT DOCUMENTS

JP    2008225822    9/2008

*Primary Examiner* — Yogesh K Aggarwal

(57) ABSTRACT

An electronic device is provided. The electronic device includes a housing, a plurality of cameras that are arranged on at least one surface of the housing, a display that is arranged on at least one surface of the housing to display image data obtained through at least one of the cameras, a memory that is arranged inside the housing to store the image data, a processor that is arranged inside the housing and is electrically connected to the cameras, the display, and the memory, and a cover that is arranged to cover at least a portion of the housing such that the at least a portion of the housing is opened and closed to provide at least a first arrangement state or a second arrangement state. The processor is configured to determine an arrangement state of the cover in response to a request signal to set at least one camera among the cameras to a photographing ready state for obtaining the image data, and to switch a photographing unit from the at least one camera to at least one other camera based on the determination result. In addition, various embodiments identified through the specification are possible.

19 Claims, 13 Drawing Sheets

(56) References Cited

U.S. PATENT DOCUMENTS

2015/0215516 A1 7/2015 Dolgin
2015/0320328 A1* 11/2015 Albert .................. A61B 5/0402
                                                                             600/480
2016/0037037 A1* 2/2016 Zou ........................ H04N 5/232
                                                                             348/262
2016/0149641 A1 5/2016 Oshima et al.

* cited by examiner it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

CAMERA SWITCHING METHOD AND ELECTRONIC DEVICE SUPPORTING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Nov. 10, 2015 in the Korean Intellectual Property Office and assigned Serial number 10-2015-0157672, the entire disclosure of which is hereby incorporated by reference.

TECHNICAL FIELD

The present disclosure relates to a technology of switching a camera.

BACKGROUND

In recent years, an electronic device such as a smartphone includes a plurality of cameras. The electronic device may select a desired camera from a plurality of cameras to drive the camera such that the camera photographs a subject. For example, the electronic device may support selfie photographing (or autonomous photographing) using a front camera or photographing of a background or people using a rear camera as the cameras are arranged on the front surface and the rear surface of the electronic device.

However, the electronic device may provide an unnecessary image if a camera is covered by an object (for example, a cover or a dual screen).

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method for switching a camera according to an arrangement state of a cover in an electronic device including a plurality of cameras and an electronic device supporting the method.

The present disclosure also provides a method for switching a camera according to a photographing enabled state of a camera and an electronic device supporting the method.

In accordance with an aspect of the present disclosure, an electronic device includes a housing, a plurality of cameras that are arranged on at least one surface of the housing, a display that is arranged on at least one surface of the housing to display image data obtained through at least one of the cameras, a memory that is arranged inside the housing to store the image data, a processor that is arranged inside the housing and is electrically connected to the cameras, the display, and the memory, and a cover that is arranged to cover at least a portion of the housing such that the at least a portion of the housing is opened and closed to provide at least a first arrangement state or a second arrangement state. The processor is configured to determine an arrangement state of the cover in response to a request signal to set at least one camera among the cameras to a photographing ready state for obtaining the image data, and to switch a photographing unit from the at least one camera to at least one other camera based on the determination result.

In accordance with another aspect of the present disclosure, a method for switching cameras of an electronic device includes receiving a request signal to set a first camera arranged on one surface of a housing of the electronic device to a photographing ready state in which the first camera is ready to obtain image data, determining an arrangement state of a cover, which is arranged to cover at least a portion of the housing such that the at least a portion of the housing is opened and closed, to provide at least a first arrangement state or a second arrangement state, switching a photographing unit from the first camera to a second camera arranged on another surface of the housing and setting the second camera to the photographing ready state when the arrangement state of the cover is the first arrangement state, and setting the first camera to the photographing ready state when the arrangement state of the cover is not the first arrangement state.

Before undertaking the DETAILED DESCRIPTION below,

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1A:
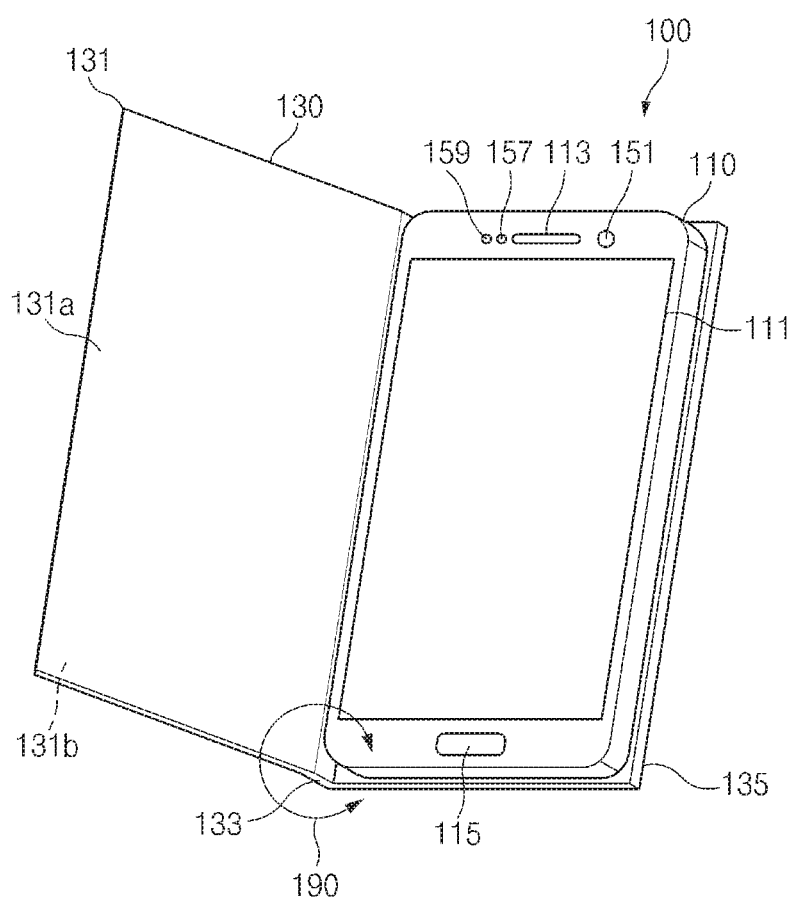
FIG. 1A is a front perspective view of an electronic device according to an embodiment of the present disclosure.

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home Sync™, Apple TV™, or Google TV™), a game console (e.g., Xbox™ or Play Station™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Figure 1B:
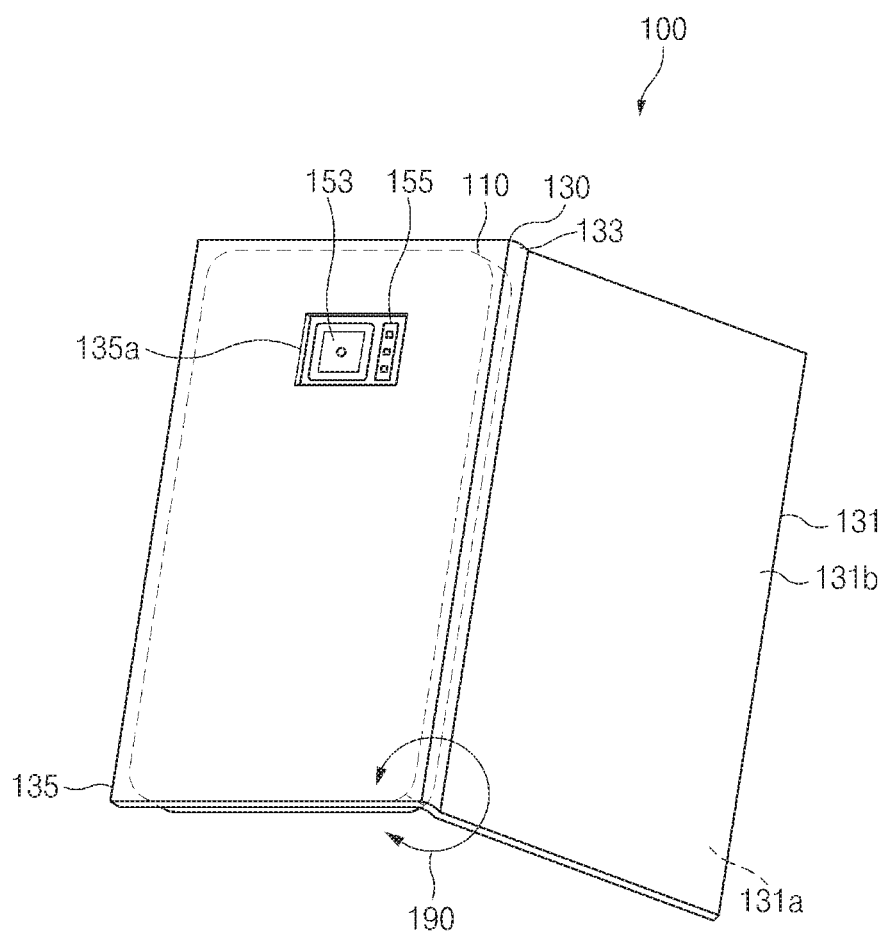
FIG. 1B is a rear perspective view of an electronic device according to an embodiment of the present disclosure.

FIG. 1A is a front perspective view of an electronic device according to an embodiment. FIG. 1B is a rear perspective view of an electronic device according to an embodiment.

Referring to FIGS. 1A and 1B, the electronic device 100 may include a housing 110 that constitutes an external appearance thereof and a cover 130 that surrounds the housing 110. The housing 110 may include a front surface, a rear surface, and side surfaces that surround at least a portion of a space between the front surface and the rear surface. According to various embodiments, a display 111, a speaker 113 (or a receiver), a physical button 115 (for example, a home button), a first camera 151, a proximity sensor 157, an illumination sensor 159, and the like may be arranged on a front surface of the housing 110. Further, a second camera 153, a flash module 155, and the like may be arranged on a rear surface of the housing 110. However, the elements arranged in the housing 110 of the electronic device 100 are not limited thereto. According to various embodiments, at least one of the above-mentioned elements may be excluded or at least one additional element may be further arranged.

The display 111 may be arranged in an area (for example, a central area) of the front surface of the housing 110. The display 111 may include, for example, a liquid crystal display (LCD), a light-emitting diode (LED) display, an organic light-emitting diode (OLED) display, a microelectromechanical systems (MEMS) display, or an electronic paper display. The display 111 may present various content (e.g., a text, an image, a video, an icon, a symbol, or the like) to the user. The display 111 may include a touch screen, and may receive a touch, gesture, proximity or hovering input from an electronic pen or a part of a body of the user.

The speaker 113 may convert an electrical signal transferred from a processor arranged inside the housing 110 into a sound and output the sound. According to various embodiments, when receiving voice communication data from an external device, the speaker 113 may output a voice of a counterpart in the received voice communication data. As in the drawing, the speaker 113 may be arranged in an area (for example, an upper end area) of the front surface of the housing 110, but may be arranged in an area (for example, a lower end area) of a side surface or a rear surface of the housing 110.

The physical button 115 may provide an input interface for executing a function supported by the electronic device 100. The physical button 115, for example, may be used for a power button, a home button, or an audio volume button. According to various embodiments, at least one physical button 115 may be arranged on at least one of the front surface, the rear surface, and the side surfaces of the housing 110.

The first camera 151 and the second camera 153, for example, may capture a still image and a video. According to an embodiment, the first camera 151 and the second camera 153 may include at least one image sensor (for example, a front sensor or a rear sensor), a lens, an image signal processor (ISP), or the like. Further, the first camera 151 and the second camera 153 may include an aperture or a shutter.

The image sensor may be arranged at a location at which image light that passed through the lens is formed into an image, and the image formed by the lens may be converted into an electrical signal (or image data). The image sensor, for example, may include a charge-coupled device (CCD) image sensor or a complementary metal-oxide semiconductor (CMOS) image sensor.

The lens, for example, may include a plurality of optical lenses, and may receive light that is input after being reflected by a subject to allow an image to be formed on a photosensitive surface of the image sensor. According to an embodiment, the lens may perform a zoom function in response to a signal of the ISP, and may automatically adjust a focus.

The ISP may execute calculations or data processing on control and/or communication of the elements related to a camera. According to an embodiment, the ISP may analyze image data that is input from the image sensor, and may control functions such as auto focusing, auto exposing (AE), auto white balancing (AWB), zooming in/out, shooting, continuous shooting, timer shooting, switching on/off of a flash, or filtering.

The aperture may adjust an amount of light that passes through the lens. For example, the aperture may be provided such that an area thereof is opened and closed, and the size of a passage through which light is input may vary according to the opening degree such that a degree at which the light that passed through the lens is exposed to the image sensor is differently adjusted.

The shutter may function to open and close the aperture. For example, light may be exposed to the image sensor as the shutter is opened and closed. According to various embodiments, the shutter may adjust an amount of light that is input to the image sensor through the lens as a time period for which the shutter opens and closes the aperture between the lens and the image sensor is adjusted longer or shorter.

Although it is illustrated in the drawing that the first camera 151 is arranged in an area (for example, an upper end area) of the front surface of the housing 110 and the second camera 153 is arranged in an area (for example, a central upper end area) of the housing 110, the present disclosure is not limited thereto. According to various embodiments, at least one additional camera (for example, a third camera) may be further arranged at least one site of the front surface, the rear surface, and the side surfaces of the housing 110.

The flash module 155 may emit light. For example, the flash module 155 may send light during a photographing operation of a camera (for example, the first camera 151 or the second camera 153) to allow the camera to obtain an additional amount of light. The flash module 155 may be arranged adjacent to the camera. Although it is illustrated in the drawing that the flash module 155 is arranged adjacent to the second camera 153, at least one additional flash module may be arranged adjacent to the first camera 151 according to various embodiments. Further, at least one additional flash module may be arranged inside a camera frame in which the first camera 151 is arranged.

The proximity sensor 157 may detect an object that approaches a target location or an object that is situated in the vicinity of the target location. For example, the proximity sensor 157 may detect an object that approaches a detection surface or an object that is situated in the vicinity of the detection surface. According to an embodiment, the electronic device 100 may recognize an arrangement state of the cover 130 through the proximity sensor 157. The proximity sensor 157 may include an inductive type, a capacitive type, an ultrasonic type, a photoelectric type, or a magnetic type. For example, when the proximity sensor 157 is of a photoelectric type, the proximity sensor 157 may include a light emitting diode and a photodiode.

The illumination sensor 159 measures an amount of light that is input from the outside, and may measure a brightness of an external environment according to the measured amount of light. The illumination sensor 159, for example, may include a CDS sensor, and the CDS sensor may calculate a resistance value that varies according to the amount of light as a brightness value.

According to various embodiments, the electronic device 100 may include at least one additional sensor other than the proximity sensor 157 and the illumination sensor 159. According to an embodiment, the electronic device 100 may further include a heart rate monitoring (HRM) sensor or a Hall sensor. The HRM sensor may measure an amount of light that passes through a measured portion (for example, a wrist or a finger) of a person by using an optical sensor to measure a change in the amount of blood in a blood vessel or an oxygen saturation in blood. According to an embodiment, if a finger contacts the HRM sensor including a light emitting unit and a light receiving unit and the contact state is maintained for not less than a specific time period, the HRM sensor may measure a change in a brightness of the finger as the amount of blood in the finger becomes larger such that the brightness of the finger becomes rather darker in a contraction period and the amount of blood in the finger becomes smaller such that the brightness of the finger becomes brighter in a release period. The Hall sensor is a sensor that uses the fact that voltage changes according to the intensity of a magnetic field, and may detect a magnetic field.

The cover 130 may include a front part 131 that covers a portion of the front surface of the housing 110, a side part 133 that extends from the front part 131 to cover a portion of the side surfaces of the housing 110, and a rear surface 135 that extends from the side surface 133 and covers a portion of the rear surface of the housing 110. However, the present disclosure is not limited thereto. According to various embodiments, at least one of the front part 131, the side part 133, or the rear part 135 may be excluded from the cover 130. According to an embodiment, the cover 130 may include only the front part 131, and in this case, one side of the front part 131 may be connected to one surface of the housing 110.

According to various embodiments, the cover 130 may be attached to and detached from the housing 110. According to an embodiment, the cover 130 may have a bonding member at a portion (for example, the rear part 135) thereof, and may be attached to and detached from the housing 110 through the bonding member. The bonding member, for example, may include a Velcro fastener, a tape, or an adhesive, but the present disclosure is not limited thereto and any detachable bonding member may be used. In some embodiments, the cover 130 may be provided integrally with the housing 110. According to an embodiment, at least a portion (for example, the rear part 135) of the cover 130 may be connected and fixed to at least one surface of the housing 110.

According to various embodiments, the rear part 135 of the cover 130 may include an opening 135a. According to an embodiment, the opening 135a may be formed in an area (for example, a central upper end area) of the rear part 135 of the cover 130. For example, the opening 135a may be arranged at a location at which the second camera 153 and the flash module 155 arranged on the rear surface of the housing 110 are arranged such that the second camera 153 and the flash module 155 may be exposed to the outside, and may be formed in an area of the rear part 135 of the cover 130.

According to various embodiments, the cover 130 may be provided to cover at least a portion of the housing 110 such that the at least a portion of the housing 110 may be opened and closed. According to an embodiment, the cover 130 may be hinged (or pivoted) about one side thereof. For example, the cover 130 may be provided such that a portion (for example, the front part 131) of the cover 130 opens and closes one surface of the housing 110 by changing an arrangement state thereof through a hinge operation 190. For example, the state of the cover 130 may be changed, through the hinge operation 190, to a state (for example, a first arrangement state) in which a first surface 131*a* of the front part 131 faces (or covers) the front surface of the housing 110, a state (for example, a second arrangement state) in which a second surface 131*b* of the front part 131 faces (or covers) the rear surface of the housing 110, or a state (for example, a third arrangement state) in which the front part 131 does not face (or cover) one surface of the housing 110.

According to various embodiments, the cover 130 may include a display (for example, a second display) at a portion (for example, the front apt 131) thereof In this case, the electronic device 100 may output at least one display object (for example, an object including a text, an image, an icon, or a video) on the display arranged in the cover 130. According to various embodiments, the electronic device 100 may complete output of a screen of the display arranged in the cover 130 in a first arrangement state of the cover 130, and may output a screen on the display arranged in the cover 130 in a second arrangement state (or a third arrangement state).

According to various embodiments, the cover 130 may include a transparent panel at a portion (for example, the front part 131) thereof. For example, the transparent panel may be arranged in an area of the front part 131 of the cover 130. The transparent panel may include glass or a transparent plastic. In some embodiments, the transparent panel may include a transparent display.

Figure 2A:
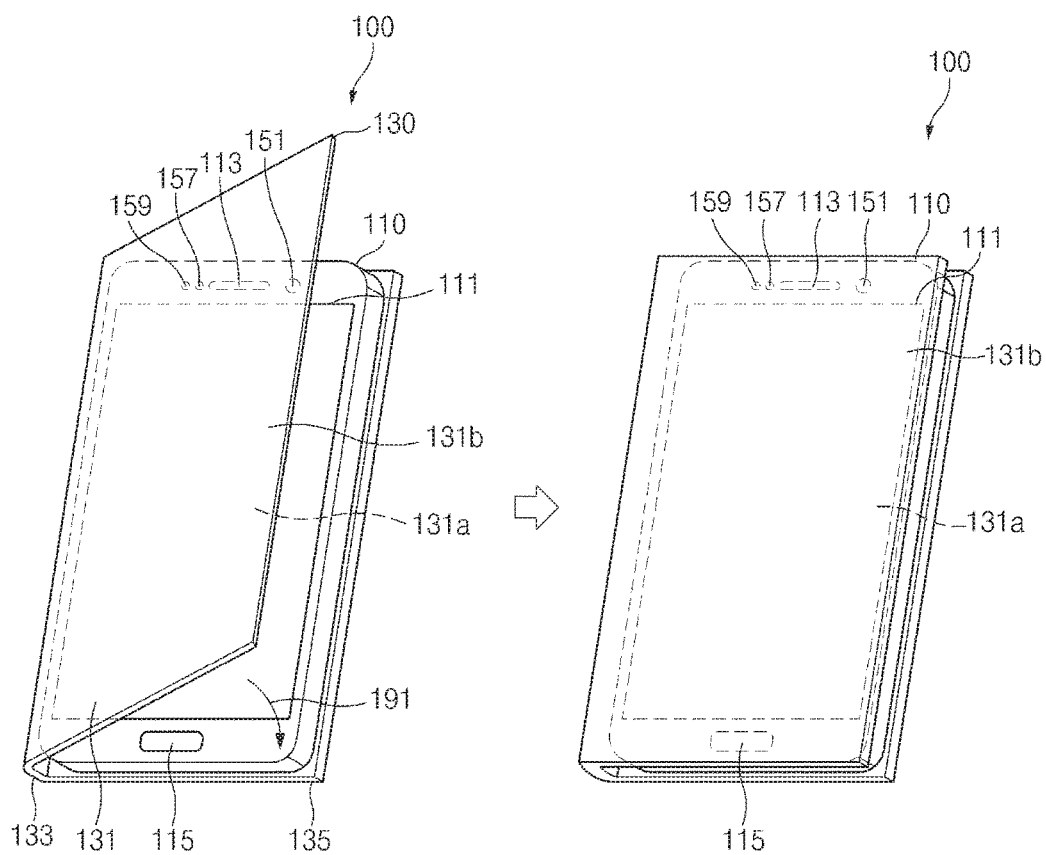
FIG. 2A is a front perspective view of an electronic device when a cover is in a first arrangement state according to an embodiment of the present disclosure.
Figure 2B:
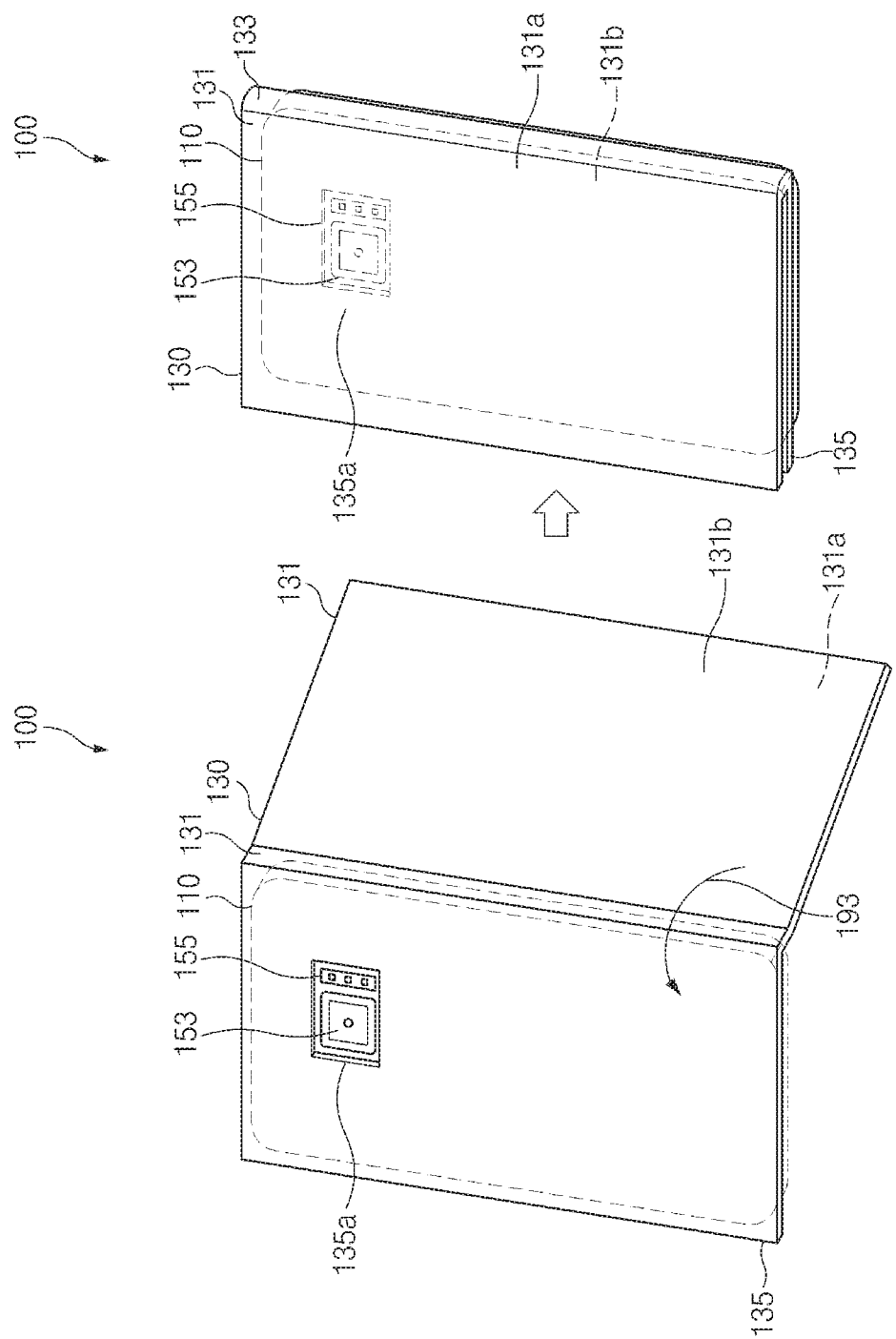
FIG. 2B is a rear perspective view of an electronic device when a cover is in a second arrangement state according to an embodiment of the present disclosure.

FIG. 2A is a front perspective view of an electronic device when a cover is in a first arrangement state according to an embodiment. FIG. 2B is a rear perspective view of an electronic device when a cover is in a second arrangement state according to an embodiment.

Referring to FIGS. 2A and 2B, the electronic device 100 may change a photographing unit (or switch a camera) according to an arrangement state of the cover 130 and provide image data. According to an embodiment, as illustrated in FIG. 2A, when the cover 130 is in a first arrangement state (for example, a state in which the first surface 131*a* of the front part 131 covers the front surface of the housing 110) or is converted into the first state through a first hinge operation 191, the first camera 151 arranged on the front surface of the housing 110 may be set to a photographing disenabled state. For example, the first camera 151 may be in a state in which a subject such as a background or a character is not ready to be photographed due to the cover 130.

According to various embodiments, if a request to set the first camera 151 to a photographing ready state is made (or a request signal is received) while the cover 130 is in the first arrangement state, the electronic device 100 may switch the photographing unit to a portion of the cover 130 (for example, another camera that is not covered by the front part 131 (for example, a second camera 153 that is arranged on the rear surface of the housing 110)) and set the other camera into a photographing ready state. In this regard, the photographing ready state is a ready state for photographing a subject through a camera, and the electronic device 100 may perform a series of operations for obtaining image data, such as an operation of applying a current to an image sensor included in the camera to set the camera to a photographing ready state, an operation of partially opening an aperture, an operation of opening a shutter, an operation of initializing a memory (or an image buffer), or an operation of providing a live view (or a preview) for a subject.

According to various embodiments, as illustrated in FIG. 2B, when the cover 130 is in a second arrangement state (for example, a state in which the second surface 13 1b of the front part 131 covers the rear surface of the housing 110) or is converted into the second state through a second hinge operation 193, the second camera 153 arranged on the rear surface of the housing 110 may be set to a photographing disenabled state. According to various embodiments, if a request for setting the second camera 153 to a photographing ready state is made (or a request signal is received) while the cover 130 is in the second arrangement state, the electronic device 100 may switch the photographing unit to a portion of the cover 130 (for example, another camera that is not covered by the front part 131 (for example, a first camera 151 that is arranged on the front surface of the housing 110)) and set the other camera into a photographing ready state.

According to various embodiments, if the photographing unit is changed (or the camera is switched) through a hinge operation and the arrangement state of the cover 130 is changed through another hinge operation, the electronic device 100 may change (or switch) the photographing unit to the previous camera and may set the previous camera to a photographing ready state. For example, if the cover 130 is changed to the first arrangement state (or the third arrangement state) after the first arrangement state (or the third arrangement state (a state in which the front part 131 does not cover one surface of the housing 110)) is changed to the second arrangement state such that the photographing unit is changed from the second camera 153 to the first camera 151 and the first camera 151 is set to a photographing ready state, the electronic device 100 may change the first camera 151 to the second camera 153 and may set the second camera 153 to a photographing ready state.

According to various embodiments, the electronic device 100 may determine an arrangement state of the cover 130 through at least one sensor of the electronic device 100. According to an embodiment, the electronic device 100 may determine an arrangement state of the cover 130 through the proximity sensor 157. For example, when a portion (for example, the front part 131) of the cover 130 is situated within a specific distance (for example, 10 cm) from the proximity sensor 157 arranged on the front surface of the housing 110, the proximity sensor 157 may determine the arrangement state of the cover 130 as the first arrangement state. For example, when the proximity sensor 157 is arranged on the rear surface of the housing 110, the proximity sensor 157 may determine the arrangement state of the cover 130 as the second arrangement state if a portion (for example, the front part 131) of the cover 130 is situated within a specific distance from the proximity sensor 157.

According to an embodiment, the electronic device 100 may determine an arrangement state of the cover 130 through the illumination sensor 159. For example, when an illumination intensity of the illumination sensor 159 rapidly changes by a specific value (for example, 100 Lux) or more within a specific time period (for example, several seconds), the illumination sensor 159 arranged on the front surface of the housing 110 may determine the arrangement state of the cover 130 as the first arrangement state. Further, when the illumination sensor 159 is arranged on the rear surface of the housing 110, the illumination sensor 159 may determine the arrangement state of the cover 130 as the second arrangement state if the illumination intensity measured through the illumination sensor 159 rapidly changes by a specific value or more within a specific time period.

According to various embodiments, the electronic device 100 may determine the arrangement state of the cover 130 through various sensors in addition to the proximity sensor 157 and the illumination sensor 159. For example, the electronic device 100 may determine the arrangement state of the cover 130 through a HRM sensor or a Hall sensor. According to an embodiment, when light of a light emitting unit (for example, an IR LED sensor) of the HRM sensor is covered, the electronic device 100 may determine that a portion (the front part 131) of the cover 130 is situated on one surface (for example, the rear surface) of the housing 110 in which the HRM sensor is arranged within a specific distance. According to another embodiment, when a portion (for example, the front part 131) of the cover 130 contains a magnetic material, the electronic device 100 may determine that the cover 130 situated within a specific distance from the Hall sensor arranged on one surface (for example, the front surface) of the housing 110 or at a portion (for example, the rear part 135) if a magnetic field (or a magnetism) of a specific magnitude or more is detected through the Hall sensor.

According to various embodiments, the electronic device 100 may change a photographing unit (or switches a camera) according to the photographing enabled state as well as the arrangement state of the cover 130, and may provide image data. According to an embodiment, if receiving a request to set one camera (for example, a first camera 151) included in the electronic device 100, the electronic device 100 determines a photographing enabled state of the camera, and when the camera is in a photographing disenabled state, the electronic device 100 may change the camera to another camera (for example, the second camera 153) included in the electronic device 100 and may set the other camera to a photographing ready state.

The photographing ready state is a state in which a subject may be photographed by a camera, and may correspond to a case in which the elements of the camera are normally operated and the camera is activated. Further, the photographing enabled state may correspond to a case in which the photographing enabled state is set to a photographing ready state, and the camera is focused within a time period (for example, situated in a range of a depth of focus) or a live view (or a preview) for the subject includes colors of a specific number or more. According to various embodiments, the camera may be focused in a scheme of detecting a phase difference of light that is input through a plurality of auto focus (AF) sensor, a scheme of detecting a contrast for an area in image data that are collected through an image sensor, and the like. The scheme of detecting a contrast is a scheme of extracting high frequency component information (for example, high frequency signal information) or edge information from an area of image data, and then determining whether the information corresponds to a threshold value or more.

The photographing disenabled state corresponds to a case in which the camera is not in the photographing enabled state, and may correspond to a case in which the camera is not focused within a specific time period or a live view (or a preview) for the subject includes colors of less than a specific number when the camera is set to a photographing ready state. According to various embodiments, the photographing disenabled state may include a case in which at least one of the elements included in the camera malfunctions due to a failure or the like, or the camera is inactivated (or terminated). According to various embodiments, the case in which the camera is not focused may include a case in which a phase difference of light that is input through a plurality of AF sensors exceeds a specific size or a case in which high frequency component information or edge information extracted from an area of image data that are collected through an image sensor corresponds to less than a threshold value.

Figure 3:
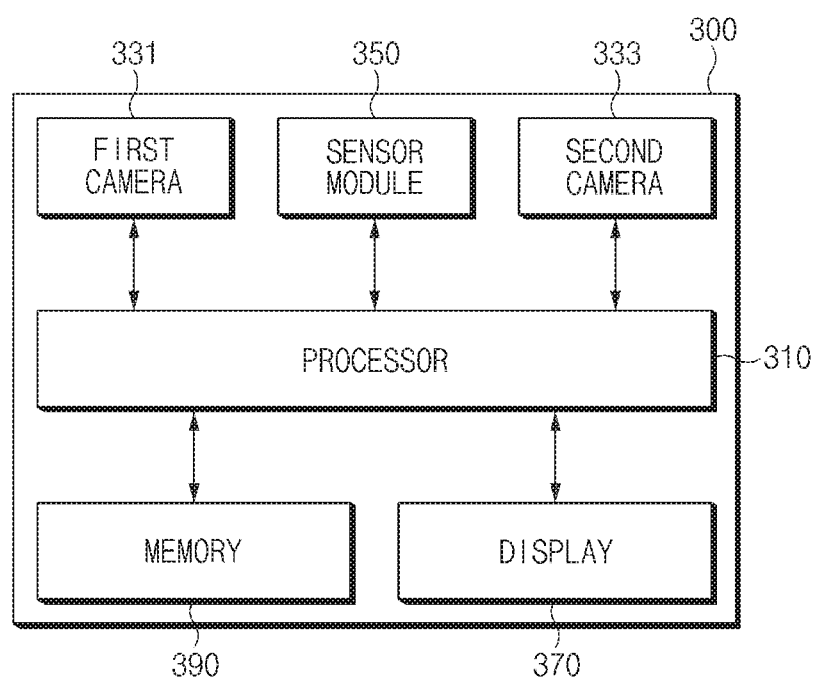
FIG. 3 is a schematic block diagram of an electronic device according to an embodiment of the present disclosure.

FIG. 3 is a schematic block diagram of an electronic device according to an embodiment of the present disclosure.

According to various embodiments, the electronic device 300 may include a configuration that is the same as or similar to those of the electronic devices 100 of FIGS. 1A to 2B. The electronic device 300 may include a processor 310, a first camera 331, a second camera 333, a sensor module 350, a display 370, and a memory 390.

The processor 310 may include at least one of a central processing unit (CPU), an application processor (AP), or a communication processor (CP). The processor 310 may perform data processing or an operation related to communication and/or control of at least one of the other elements of the electronic device 300. The processor 310 may run an operating system or an application program so as to control a plurality of hardware or software elements connected to the processor 310, and may process various data and perform operations. According to an embodiment of the present disclosure, the processor 310 may further include a graphic processing unit (GPU) and/or an image signal processor.

According to various embodiments, the processor 310 may set the first camera 331 or the second camera 333 to a photographing ready state. According to an embodiment, the processor 310 may apply a current to the ISP, partially open an aperture, open a shutter, initialize a portion (for example, an area used as an image buffer) of the memory 390, or output a live view (or a preview) for the subject on the display 370.

According to various embodiments, the processor 310 may analyze image data that are acquired through the first camera 331 or the second camera 333. According to an embodiment, the processor 310 may extract high frequency component information or edge information from the acquired image data. Further, the processor 310 may compare the extracted high frequency component information or edge information with a threshold value corresponding to the information, and may determine whether the camera is focused. According to various embodiments, the processor 310 may analyze a live view (or a preview). According to an embodiment, the processor 310 may analyze the number of colors included in a live view (or a preview).

According to various embodiments, the processor 310 may determine a photographing enable state (or a photographing disenabled state) of the first camera 331 or the second camera 333. According to an embodiment, the processor 310 may determine the first camera 331 or the second camera 333 is in a photographing ready state. For example, the processor 310 may determine whether a current has been applied to the ISP, the aperture has been partially opened, the shutter is opened, a portion of the memory 390 has been initialized, or a live view (or a preview) for the subject has been output to the display 370. According to an embodiment, the processor 310 may determine whether the camera has been focused within a specific time period, or the live view (or the preview) includes colors of a specific number or more. According to various embodiments, the processor 310 may identify whether at least one of the elements included in the first camera 331 or the second camera 333 malfunctions due to a disorder or the first camera 331 or the second camera 333 is inactive (or terminated).

According to various embodiments, the processor 310 may analyze sensing information acquired through the sensor module 350 to determine an arrangement state of a cover (for example, the cover 130 of FIG. 1A to 2B). Further, the processor 310 may switch a camera according to an arrangement state of the cover. Further, the processor 310 may switch the camera according to a photographing enabled state of the camera. According to an embodiment, if the cover is in a first arrangement state, the photographing unit may be changed from the first camera 331 to the second camera 333, and if the cover is in a second arrangement state, the photographing unit may be changed from the second camera 333 to the first camera 331.

According to various embodiments, the processor 310 may perform a control such that the recorded image data are stored in the memory 390 if, while a camera (for example, the first camera 331) is in a recording state, the photographing unit is switched from the camera to another camera (for example, the second camera 333).

The first camera 331 and the second camera 333, for example, may capture a still image and a video. The first camera 331 and the second camera 333 may perform functions that are the same as or similar to those of the first camera 151 and the second camera 153 of FIGS. 1A to 2B.

The sensor module 350 may, for example, measure physical quantity or detect an operation state of the electronic device 300 so as to convert measured or detected information into an electrical signal. The sensor module 350 may include, for example, at least one of a proximity sensor, an illumination sensor, a hear rate monitoring (HRM) sensor, and a Hall sensor. The sensor module 350 may further include a control circuit for controlling at least one sensor included therein.

The display 370 may present various content (e.g., a text, an image, a video, an icon, a symbol, or the like) to the user. The display 370 may perform a function that is the same as or similar to that of the display 111 of FIGS. 1A and 2A. According to various embodiments, a plurality of displays 370 may be provided. For example, the first display may be arranged in a housing (for example, the housing 110 of FIG. 1A to 2B) of the electronic device 300, and the second display may be arranged in the cover of the electronic device 300.

The memory 390 may include a volatile memory and/or a nonvolatile memory. The memory 390 may store instructions or data related to at least one of the other elements of the electronic device 300. According to an embodiment of the present disclosure, the memory 390 may store software and/or a program. According to various embodiments, a portion of the memory 390 may be used as an image buffer. According to various embodiments, the memory 390 may store the image data that have been acquired through the first camera 331 or the second camera 333.

As described above, according to various embodiments, an electronic device may include a housing, a plurality of cameras that are arranged on at least one surface of the housing, a display that is arranged on at least one surface of the housing to display image data obtained through at least one of the cameras, a memory that is arranged inside the housing to store the image data, a processor that is arranged inside the housing and is electrically connected to the cameras, the display, and the memory, and a cover that is arranged to cover at least a portion of the housing such that the at least a portion of the housing is opened and closed to provide at least a first arrangement state or a second arrangement state. The processor may be configured to determine an arrangement state of the cover in response to a request signal to set at least one camera among the cameras to a photographing ready state for obtaining the image data, and to switch a photographing unit from the at least one camera to at least one other camera based on the determination result.

According to various embodiments, the electronic device may further include a sensor module that is arranged on at least one surface of the housing or at least a portion of the cover. The processor may be configured to analyze sensing information obtained through the sensor module, and to determine the arrangement state of the cover based on the analysis result.

According to various embodiments, the sensor module may include at least one of a proximity sensor, an illumination sensor, a heat rate monitoring (HRM) sensor, and a Hall sensor.

According to various embodiments, the processor may be configured to analyze a spacing distance between the proximity sensor and a portion of the cover, which is obtained through the proximity sensor, and to determine the arrangement state of the cover based on the analysis result.

According to various embodiments, the processor may be configured to analyze whether an illumination intensity obtained through the illumination sensor is changed to a specific intensity or more within a specific time period, and to determine the arrangement state of the cover based on the analysis result.

According to various embodiments, the processor may be configured to analyze a loss degree of light obtained through the HRM sensor, and to determine the arrangement state of the cover based on the analysis result.

According to various embodiments, the processor may be configured to analyze an intensity of a magnetic field obtained through the Hall sensor, and to determine the arrangement state of the cover based on the analysis result.

According to various embodiments, the processor may be configured to determine whether the at least one camera is in a photographing enabled state in which the at least one camera is ready to photograph a subject, and to switch the photographing unit from the at least one camera to the at least one other camera based on the determination result.

According to various embodiments, the processor may be configured to determine that the at least one camera is in a photographing ready state when a phase difference of light that is input through an auto focusing (AF) sensor of the at least one camera is a specific magnitude or less, a value of high-frequency component information or contour information extracted from an area of image data collected through the image sensor of the at least one camera is a specific size or more, or the number of colors contained in a live view or a preview obtained through the at least one camera is a specific value or more in a state in which elements of the at least one camera normally operate and the at least one camera is activated.

According to various embodiments, the cover may include at least one of a transparent panel, a transparent display, or another display.

Figure 4:
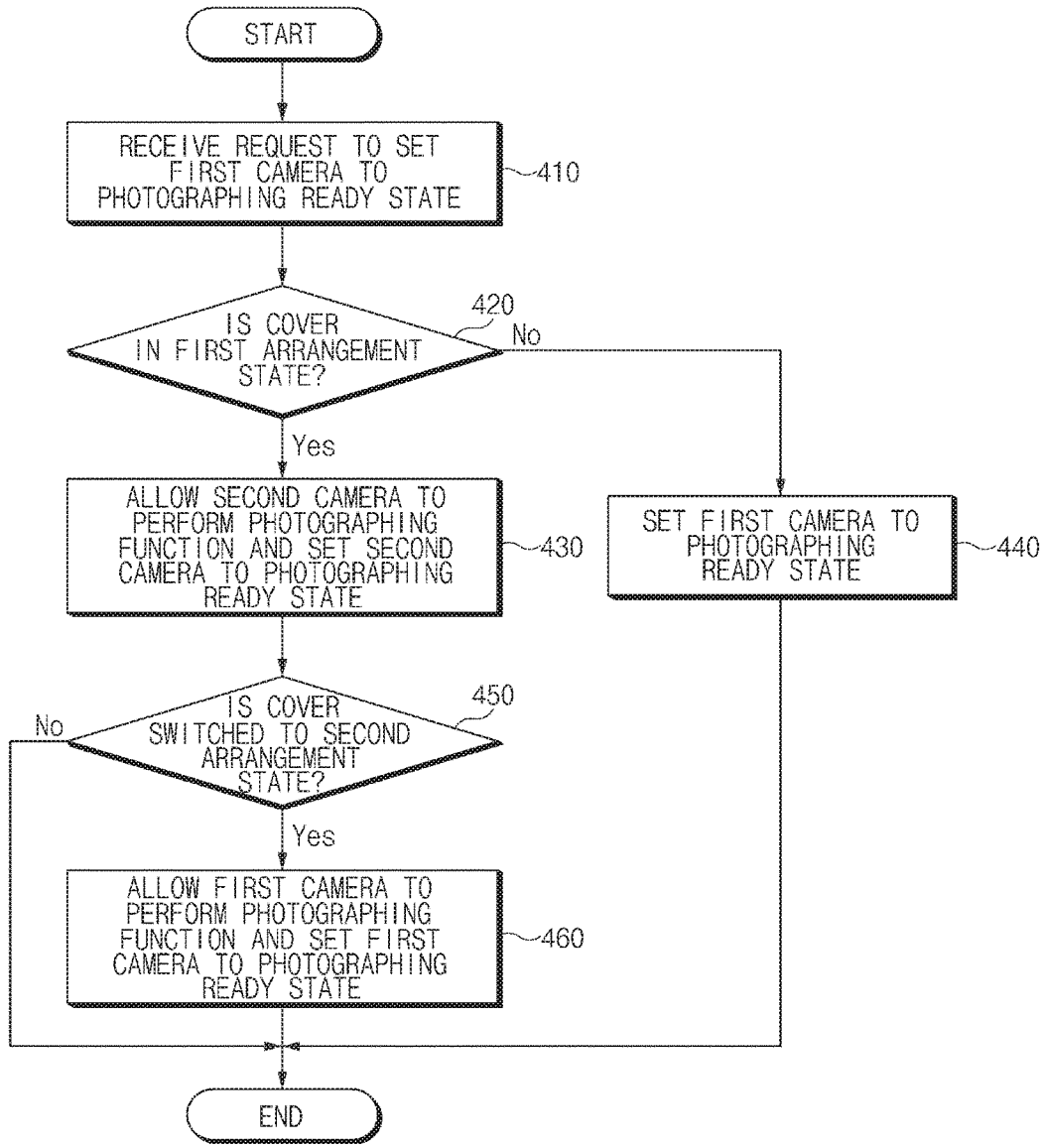
FIG. 4 is a flowchart illustrating a method for managing an electronic device according to an arrangement state of a cover according to an embodiment of the present disclosure.

FIG. 4 is a flowchart illustrating a method for managing an electronic device according to an arrangement state of a cover according to an embodiment.

Referring to FIG. 4, in operation 410, the electronic device (for example, the electronic device 100 of FIGS. 1A to 2B) may receive a request signal to set the first camera (for example, the first camera 151 of FIGS. 1A and 2A) to a photographing ready state. According to various embodiments, the first camera may be arranged on the front surface of a housing (for example, the housing 110 of FIGS. 1A to 2B) of the electronic device.

In operation 420, the electronic device may determine whether the cover (the cover 130 of FIGS. 1A to 2B) is in a first arrangement state. According to various embodiments, the first arrangement state may be a state in which a portion (for example, the front part) of the cover covers the front surface of the housing of the electronic device. Further, the first arrangement state may be a state in which a portion (for example, the front part) of the cover is situated within a specific distance (for example, 10 cm) from the front surface of the housing of the electronic device. According to various embodiments, the electronic device may determine an arrangement state of the cover through a sensor module (for example, the sensor module 350 of FIG. 3). For example, the electronic device may analyze the sensing information that has been acquired through a proximity sensor, an illumination sensor, an HRM sensor, or a Hall sensor and may determine an arrangement state of the cover.

According to various embodiments, when the cover is in a first arrangement state, in operation 430, the photographing unit may be changed to the second camera (for example, the second camera 153 of FIGS. 1B and 2B) and the second camera may be set to a photographing ready state. According to various embodiments, the second camera may be arranged on the rear surface of the housing of the electronic device. According to various embodiments, in relation to setting of a photographing ready state of the second camera, the electronic device may apply a current to an image sensor included in the second camera, partially open an aperture, open a shutter, initialize a portion (for example, an area used as an image buffer) of the memory, or output a live view (or a preview) for the subject, which has been acquired through the second camera, on the display (for example, the display 111 of FIGS. 1A and 2A). According to various embodiments, when the cover is not in a first arrangement state, in operation 440, the electronic device may set the first camera to a photographing ready state.

In operation 450, the electronic device may determine whether the cover has been switched (changed) to the second arrangement state. According to various embodiments, the second arrangement state may be a state in which a portion (for example, the front part) of the cover covers the front surface of the housing of the electronic device. Further, the second arrangement state may be a state in which a portion (for example, the front part) of the cover is situated within a specific distance (for example, 10 cm) from the front surface of the housing of the electronic device.

According to various embodiments, when the cover is switched (or changed) to a second arrangement state, in operation 460, the electronic device changes the photographing unit to the first camera and set the first camera to a photographing ready state. According to various embodiments, even when the cover is switched (or changed) to a third state (for example, a portion (for example, the front part) of the cover does not cover one surface of the housing of the electronic device) as well as a second state, the electronic device may perform operation 460. For example, If one surface (e.g., the front surface) of the housing in which the first camera that had been the photographing unit before the photographing unit was changed comes into a state in which the first camera is not covered by a portion (for example, the front part) of the cover, the electronic device may change the photographing unit to the first camera again. In some embodiments, if one surface (e.g., the rear surface) of the housing on which the second camera that is the current photographing unit is not covered by a portion (for example, the front part) of the cover (for example, the third arrangement state) even though one surface (for example, the front surface) of the housing on which the first camera that had been the photographing unit before the photographing unit was changed comes into an state in which the first camera is not covered by a portion (for example, the front part) of the cover, the electronic device may not change the photographing unit. Further, even when the cover is not switched (or changed) to the second arrangement state, the electronic device may maintain the second camera as the photographing unit.

Figure 5:
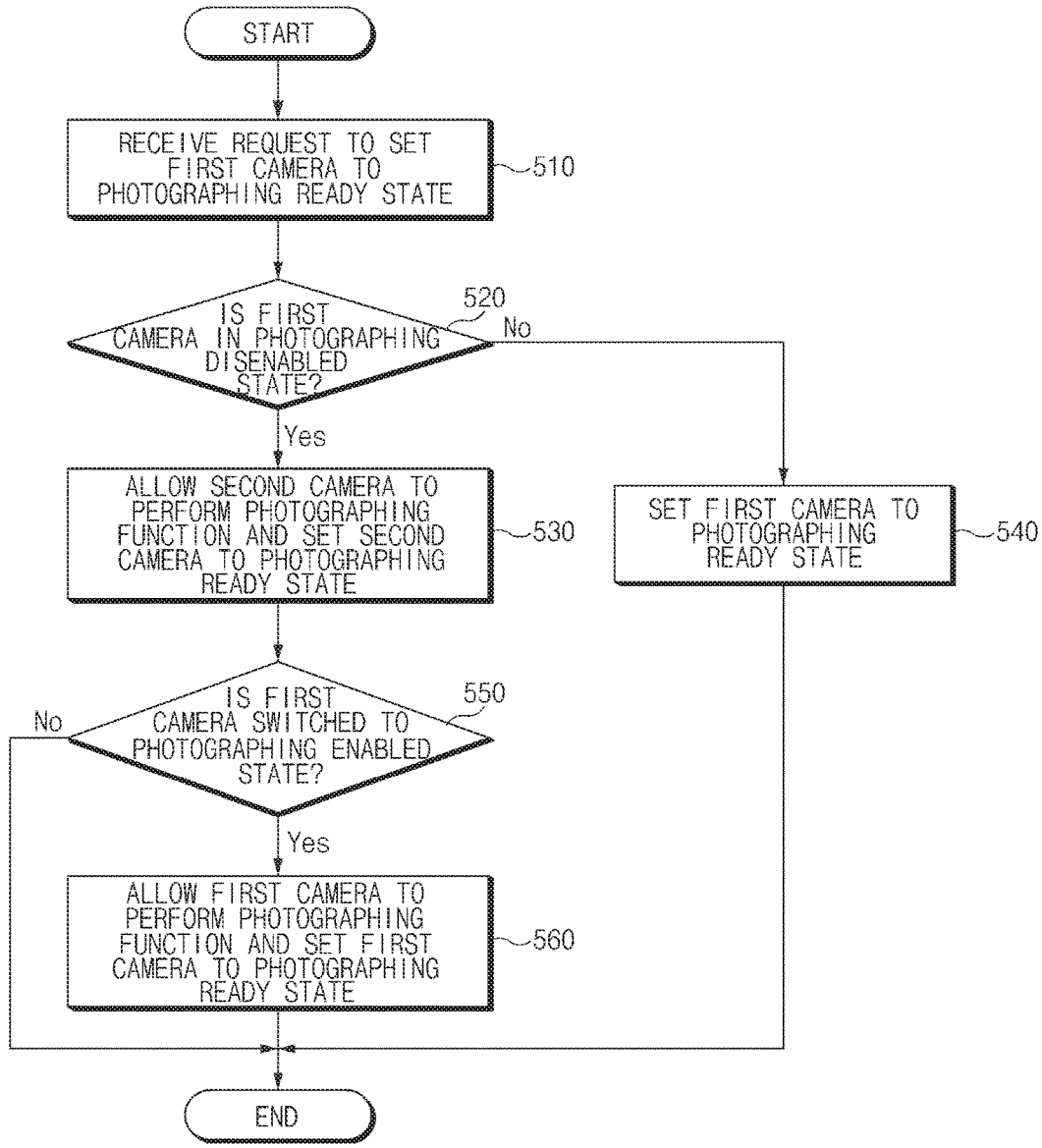
FIG. 5 is a flowchart illustrating a method for managing an electronic device according to a photographing enabled state of a cover according to an embodiment of the present disclosure.

FIG. 5 is a flowchart illustrating a method for managing an electronic device according to a photographing enabled state of a cover according to an embodiment. According to various embodiments, the electronic device (for example, the electronic device 100 of FIGS. 1A to 2B) may change (or switch the camera) the photographing unit according to a photographing enabled state of the camera as well as an arrangement state of the cover (for example, the cover 130 of FIGS. 1A to 2B). In the following description, a detailed description of an operation that is the same as or similar to the above-described operation of FIG. 4 will be omitted.

In operation 510, the electronic device may receive a request signal to set the first camera (the first camera 151 of FIGS. 1A and 2A) to a photographing ready state. In operation 520, the electronic device may determine whether the first camera is in a photographing disenabled state. According to an embodiment, the electronic device may determine whether at least one of the elements included in the first camera malfunctions due to a disorder or the first camera is inactive (or terminated).

According to various embodiments, when the first camera is in a photographing disenabled state, in operation 530, the photographing unit may be changed to the second camera (for example, the second camera 153 of FIGS. 1B and 2B) and the second camera may be set to a photographing ready state.

According to various embodiments, when the first camera is not in a photographing disenabled state, in operation 540, the electronic device may set the first camera to a photographing ready state. According to various embodiments, when the first camera is not focused within a specific time period when being set to a photographing ready state or the live view (or the preview) for the subject acquired through the first camera includes colors of less than a specific number, the electronic device may stop operation 540 and perform operation 530.

In operation 550, the electronic device may determine whether the first camera is switched into in a photographing enabled state. For example, the electronic device may determine whether causes of the photographing disenabled state of the first camera have been solved. For example, the electronic device may determine whether the elements included in the first camera are normally operated or the first camera is active.

According to various embodiments, when the first camera is switched to a photographing enabled state, in operation 560, the electronic device may change the photographing unit to the first camera and set the first camera to a photographing ready state. According to various embodiments, even in operation 560, when the first camera is not focused within a specific time period when being set to a photographing ready state or the live view (or the preview) for the subject acquired through the first camera includes colors of less than a specific number, the electronic device may stop operation 560 and perform operation 530. In some embodiments, the electronic device may not change the photographing unit even when the first camera is changed to a photographing enabled state. Further, even when the first camera is not switched into a photographing enabled state, the electronic device may maintain the second camera as the photographing unit.

As described above, according to various embodiments, a method for switching cameras of an electronic device may include receiving a request signal to set a first camera arranged on one surface of a housing of the electronic device to a photographing ready state in which the first camera is ready to obtain image data, determining an arrangement state of a cover, which is arranged to cover at least a portion of the housing such that the at least a portion of the housing is opened and closed, to provide at least a first arrangement state or a second arrangement state, switching a photographing unit from the first camera to a second camera arranged on another surface of the housing and setting the second camera to the photographing ready state when the arrangement state of the cover is the first arrangement state, and setting the first camera to the photographing ready state when the arrangement state of the cover is not the first arrangement state.

According to various embodiments, the determining of the arrangement state of the cover may include obtaining a spacing distance between the proximity sensor and a portion of the cover through a proximity sensor arranged on at least one surface of the housing, analyzing the spacing distance, and determining the arrangement state of the cover based on the analysis result.

According to various embodiments, the determining of the arrangement state of the cover may include obtaining an illumination intensity value through an illumination sensor arranged on at least one surface of the housing, analyzing whether the illumination intensity value is changed to a specific size or more within a specific time period, and determining the arrangement state of the cover based on the analysis result.

According to various embodiments, the determining of the arrangement state of the cover may include obtaining a loss degree of light through a heart rate monitoring sensor arranged on at least one surface of the housing, analyzing the loss degree of the light, and determining the arrangement state of the cover based on the analysis result.

According to various embodiments, the determining of the arrangement state of the cover may include obtaining an intensity of a magnetic field through a Hall sensor arranged on at least one surface of the housing or at least a portion of the cover, analyzing the intensity of the magnetic field, and determining the arrangement state of the cover based on the analysis result.

According to various embodiments, the setting of the first camera or the second camera to the photographing ready state may include at least one of applying a current to an image sensor of the first camera or the second camera, partially opening an aperture of the first camera or the second camera, opening a shutter of the first camera or the second camera, initializing a portion of a memory related to the first camera or the second camera, and outputting a live view or a preview of a subject obtained through the first camera or the second camera on a display.

According to various embodiments, the method may further include switching the photographing unit from the second camera to the first camera and setting the first camera to the photographing enabled state when the arrangement state of the cover is switched from the first arrangement state to the second arrangement state.

According to various embodiments, the method may further include determining whether the first camera is in a photographing enabled state in which the first camera is ready to photograph a subject, in response to a request signal that requests the first camera to be set to the photographing ready state, switching the photographing unit from the first camera to the second camera and setting the second camera to the photographing ready state when the first camera is in a photographing disenabled state, and setting the first camera to the photographing ready state when the first camera is in the photographing enabled state.

According to various embodiments, the determining of the photographing enabled state may include determining that the first camera is in the photographing enabled state when a phase difference of light that is input through an auto focusing (AF) sensor of the first camera is a specific magnitude or less, a value of high-frequency component information or contour information extracted from an area of image data collected through the image sensor of the first camera is a specific size or more, or the number of colors contained in a live view or a preview obtained through the first camera is a specific value or more in a state in which elements of the first camera are normally operated and the first camera is activated.

According to various embodiments, switching the photographing unit from the second camera to the first camera and setting the first camera to the photographing enabled state when the first camera is switched from the photographing disenabled state to the photographing enabled state.

Figure 6:
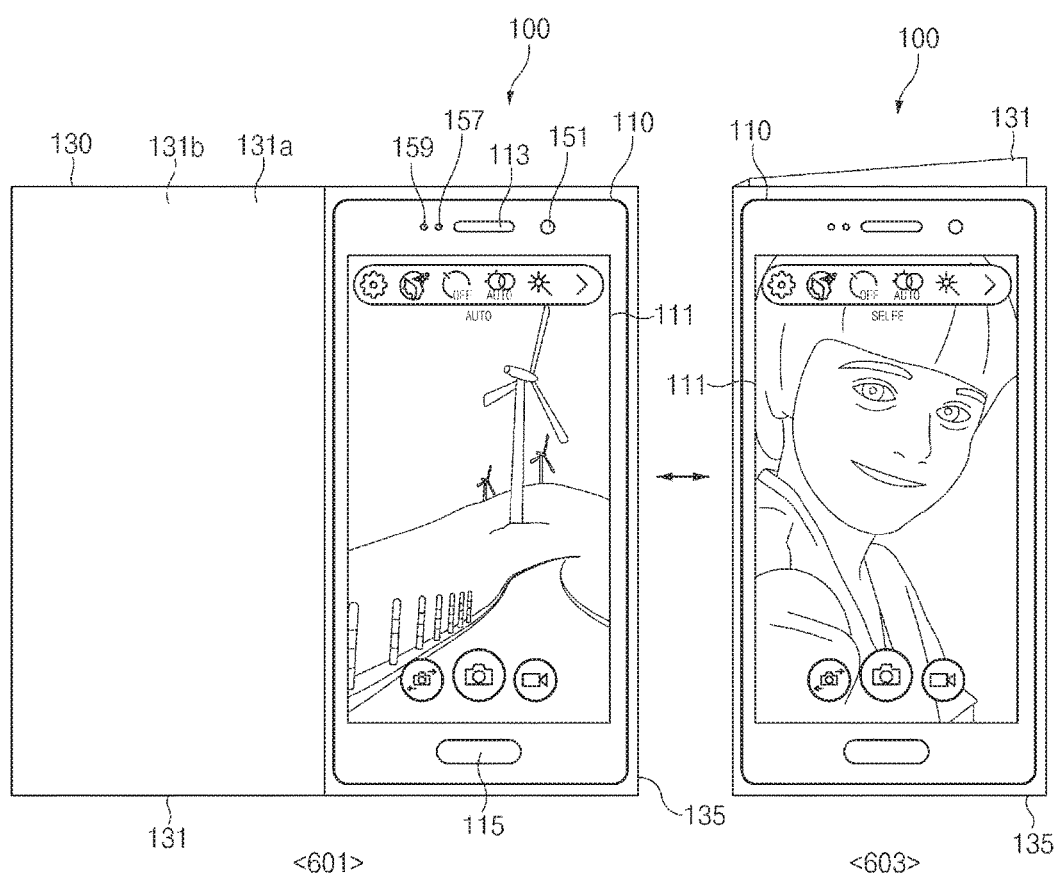
FIG. 6 is an exemplary view of a screen that is provided in relation to switching of a camera when a cover is changed into a second arrangement state according to an embodiment of the present disclosure.

FIG. 6 is an exemplary view of a screen that is provided in relation to switching of a camera when a cover is changed into a second arrangement state according to an embodiment.

Referring to FIG. 6, as in the first state 601, when the cover 130 is in the third arrangement state (for example, a state in which a portion (for example, the front part 131) of the cover 130 does not cover one surface of the housing 110) or in the first arrangement state (for example, a state in which a portion (for example, the front part 131) of the cover 130 covers one surface (for example, the front surface) of the housing 110 or is present within a specific distance from the housing 110), the electronic device 100 may output image data acquired through the second camera (for example, although not illustrated, the camera arranged on one surface (for example, the rear surface) of the housing 110) on the display 111.

According to various embodiments, as in the second state 603, if the cover 130 is changed into the second state (for example, a state in which a portion (for example, the front part 131) of the cover 130 covers one surface (for example, the rear surface) of the housing 110 or is present within a specific distance from the one surface of the housing 110), the electronic device 100 may change the photographing unit from the second camera to the first camera 151 and may output the image data acquired through the first camera 151 on the display 111.

According to various embodiments, if the state of the electronic device 100 is changed from the second state 603 to the first state 601, for example, if the state of the cover 130 is changed from the second arrangement state to the third arrangement state or the first arrangement state, the electronic device 100 may change the photographing unit from the first camera 151 to the second camera and may output the image data acquired through the second camera on the display 111.

According to various embodiments, the electronic device 100 may determine an arrangement state of the cover 130, based on a sensor module (for example, a proximity sensor 157, an illumination sensor 159, an HRM sensor (not illustrated), or a Hall sensor (not illustrated)) on at least one surface of the housing 110. According to an embodiment, the electronic device 100 may calculate a distance from a portion (for example, the front part 131) of the cover 130 of the cover 130 through the proximity sensor 157. According to an embodiment, the electronic device 100 may detect whether an intensity of illumination is changed by a specific magnitude (for example, 10 Lux or more) within a specific time period (for example, several seconds) as a portion (for example, the front part 131) of the cover 130 covers one surface (for example, the front surface) of the housing 110 in which the illumination sensor 159 is arranged, based on the illumination sensor 159. According to an embodiment, the electronic device 100 may detect whether light of the light emitting unit of the HRM sensor is covered by a portion (for example, the front part 131) of the cover 130 (or a degree of loss of light), based on the HRM sensor. According to an embodiment, when a portion (for example, the front part 131) of the cover 130 includes a magnetic material, the electronic device 100 may detect an intensity of a magnetic field based on the Hall sensor to identify a proximity of the magnetic material.

According to various embodiments, when a portion (for example, the front part 131) of the cover 130 does not include a transparent material (for example, a transparent panel or a transparent display), the electronic device 100 may terminate output of a screen of the display 111 in the first arrangement state.

Figure 7:
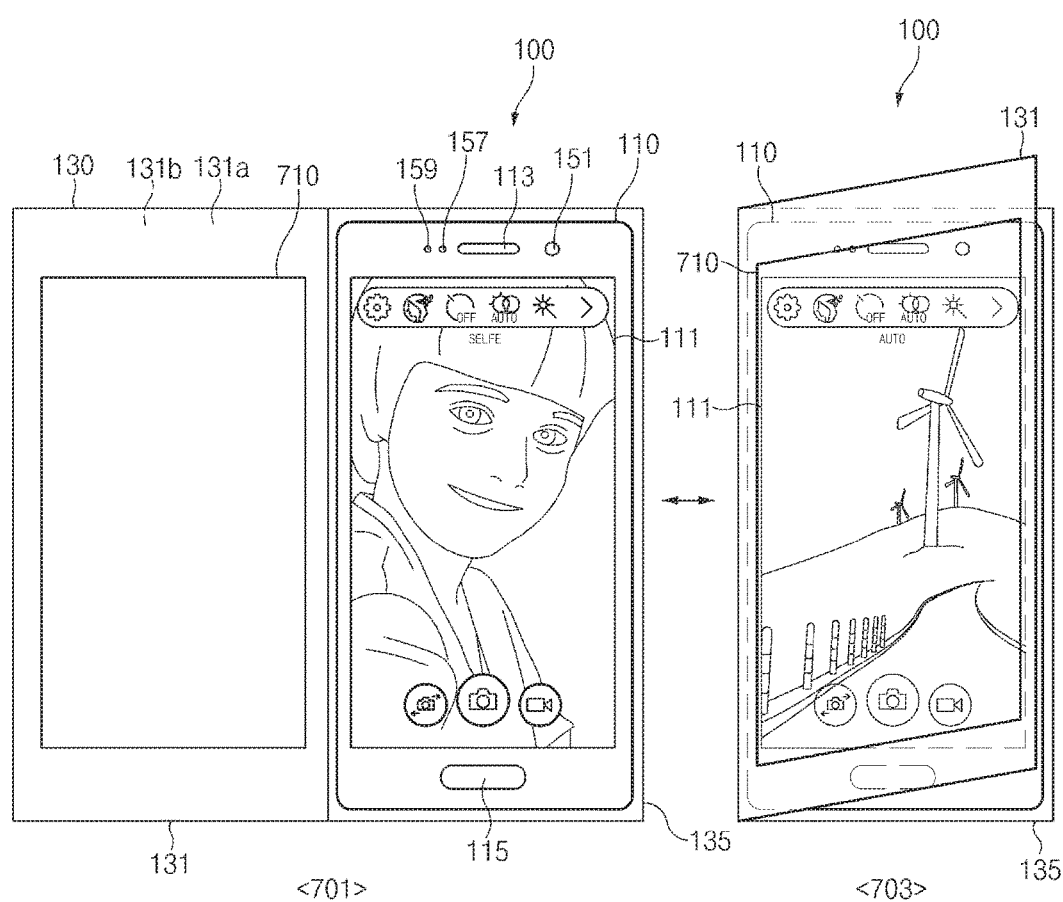
FIG. 7 is an exemplary view of a screen that is provided in relation to switching of a camera when a cover is changed into a first arrangement state according to an embodiment of the present disclosure.

FIG. 7 is an exemplary view of a screen that is provided in relation to switching of a camera when a cover is changed into a first arrangement state according to an embodiment.

Referring to FIG. 7, as in the first state 701, when the cover 130 is in the third arrangement state (for example, a state in which a portion (for example, the front part 131) of the cover 130 does not cover one surface of the housing 110) or in the second arrangement state (for example, a state in which a portion (for example, the front part 131) of the cover 130 covers one surface (for example, the rear surface) of the housing 110 or is present within a specific distance from the housing 110), the electronic device 100 may output image data acquired through the second camera (for example, although not illustrated, the camera arranged on one surface (for example, the rear surface) of the housing 110) on the display 111.

According to various embodiments, as in the second state 703, if the cover 130 is changed into the second state (for example, a state in which a portion (for example, the front part 131) of the cover 130 covers one surface (for example, the front surface) of the housing 110 or is present within a specific distance from the one surface of the housing 110), the electronic device 100 may change the photographing unit from the first camera to the second camera (although not illustrated, the camera arranged on one surface (for example, the rear surface) of the housing 110) and may output the image data acquired through the second camera 153 on the display 111. According to various embodiments, if the state of the electronic device is changed from the second state 703 to the first state 701, for example, if the state of the cover 130 is changed from the first arrangement state to the third arrangement state or the second arrangement state, the electronic device 100 may change the photographing unit from the second camera to the first camera 151 and may output the image data acquired through the first camera 151 on the display 111.

According to various embodiments, the electronic device 100 may include a transparent panel 710 on a portion (for example, the front part 131) of the cover 130. In some embodiments, the transparent panel 710 may include a transparent display. When the transparent panel 710 includes a transparent display, the electronic device 100 may output a screen on the transparent display in the first state 701. Further, if the electronic device 100 is changed into the second state 701, the electronic device may terminate output of a screen of the transparent display such that the image data output on the display 111 may be identified from the outside through the transparent display.

Figure 8:
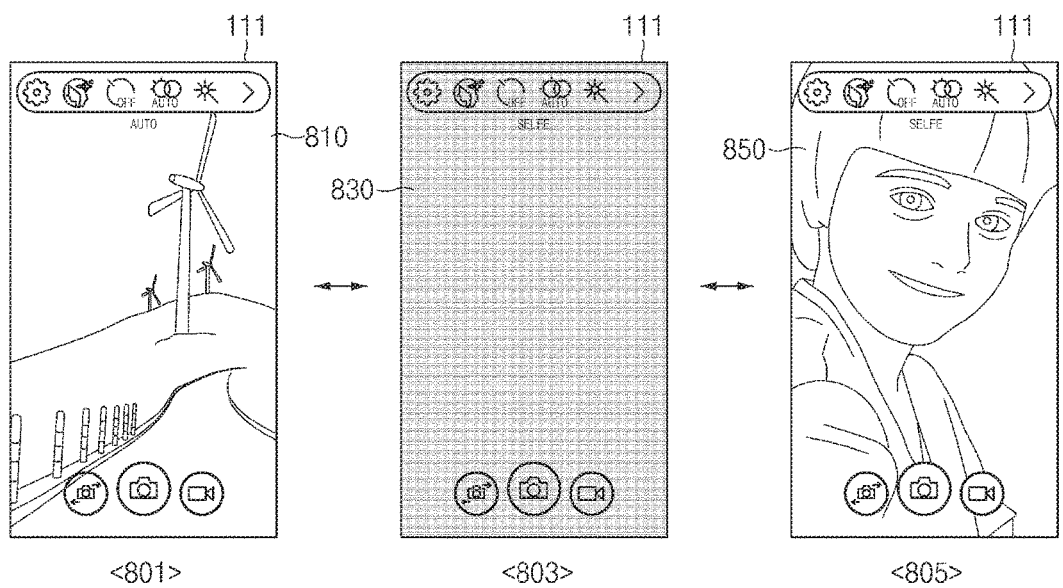
FIG. 8 is an exemplary view of a screen that is provided in relation to switching of a camera according to a photographing enabled state of a camera according to an embodiment of the present disclosure.

FIG. 8 is an exemplary view of a screen that is provided in relation to switching of a camera according to a photographing enabled state of a camera according to an embodiment. According to various embodiments, the electronic device (for example, the electronic device 100 of FIGS. 1A to 2B) may change (or switch the camera) the photographing unit according to a photographing enabled state of the camera.

Referring to FIG. 8, the electronic device may output image data 810 acquired through the second camera (for example, the second camera 153 of FIGS. 1B and 2B) on the display 111. According to various embodiments, when the image data 830 acquired through the second camera include colors of less than a specific number as in the second state 803, the electronic device may change the photographing unit to the first camera (for example, the first camera 151 of FIGS. 1A and 2A) as in the third state 805.

According to various embodiments, the inverse case is also possible. For example, in a state in which the electronic device outputs the image data 850 acquired through the first camera as in the third state 805, when the image data 830 acquired through the first camera includes colors of less than a specific number as in the second state 803, the electronic device may change the photographing unit to the second camera and output the image data 810 acquired through the second camera as in the first state 801.

According to various embodiments, the electronic device 100 may change the photographing unit when the second state 803 continues for a specific time or more. Further, in addition to the number of colors included in the image data, the electronic device 100 may extract high frequency component information or edge information from the image data, compare the extracted high frequency component information or edge information with a threshold value corresponding to the information, determine whether the camera is focused, and change the photographing unit when the camera is not focused for a specific time or more.

As described above, the electronic device may change the photographing unit according to a photographing enabled state of the camera to change the photographing unit to a camera in a photographing enabled state even when the camera is covered by not only the cover but also a portion of the body of the user or another object so as to continuously output image data on the display.

Figure 9:
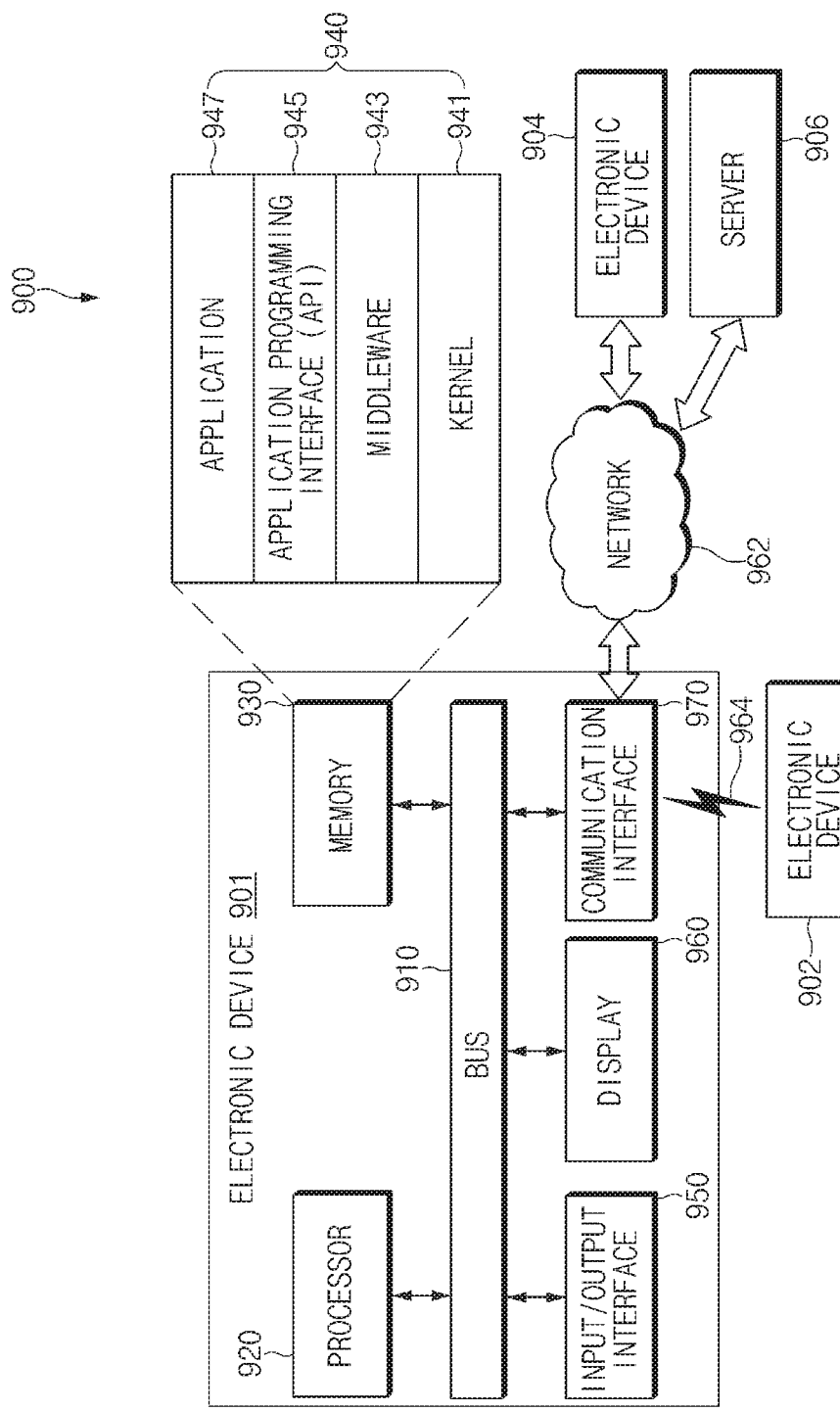
FIG. 9 illustrates an electronic device in a network environment according to an embodiment of the present disclosure.

FIG. 9 illustrates an electronic device in a network environment according to an embodiment of the present disclosure.

An electronic device 901 in a network environment 900 according to various embodiments of the present disclosure will be described with reference to FIG. 9. The electronic device 901 may include a bus 910, a processor 920, a memory 930, an input/output interface 950, a display 960, and a communication interface 970. In various embodiments of the present disclosure, at least one of the foregoing elements may be omitted or another element may be added to the electronic device 901.

The bus 910 may include a circuit for connecting the above-mentioned elements 910 to 970 to each other and transferring communications (e.g., control messages and/or data) among the above-mentioned elements.

The processor 920 may include at least one of a central processing unit (CPU), an application processor (AP), or a communication processor (CP). The processor 920 may perform data processing or an operation related to communication and/or control of at least one of the other elements of the electronic device 901.

The memory 930 may include a volatile memory and/or a nonvolatile memory. The memory 930 may store instructions or data related to at least one of the other elements of the electronic device 901. According to an embodiment of the present disclosure, the memory 930 may store software and/or a program 940. The program 940 may include, for example, a kernel 941, a middleware 943, an application programming interface (API) 945, and/or an application program (or an application) 947. At least a portion of the kernel 941, the middleware 943, or the API 945 may be referred to as an operating system (OS).

The kernel 941 may control or manage system resources (e.g., the bus 910, the processor 920, the memory 930, or the like) used to perform operations or functions of other programs (e.g., the middleware 943, the API 945, or the application program 947). Furthermore, the kernel 941 may provide an interface for allowing the middleware 943, the API 945, or the application program 947 to access individual elements of the electronic device 901 in order to control or manage the system resources.

The middleware 943 may serve as an intermediary so that the API 945 or the application program 947 communicates and exchanges data with the kernel 941.

Furthermore, the middleware 943 may handle one or more task requests received from the application program 947 according to a priority order. For example, the middleware 943 may assign at least one application program 947 a priority for using the system resources (e.g., the bus 910, the processor 920, the memory 930, or the like) of the electronic device 901. For example, the middleware 943 may handle the one or more task requests according to the priority assigned to the at least one application, thereby performing scheduling or load balancing with respect to the one or more task requests.

The API 945, which is an interface for allowing the application 947 to control a function provided by the kernel 941 or the middleware 943, may include, for example, at least one interface or function (e.g., instructions) for file control, window control, image processing, character control, or the like.

The input/output interface 950 may serve to transfer an instruction or data input from a user or another external device to (an)other element(s) of the electronic device 901. Furthermore, the input/output interface 950 may output instructions or data received from (an)other element(s) of the electronic device 901 to the user or another external device.

The display 960 may include, for example, a liquid crystal display (LCD), a light-emitting diode (LED) display, an organic light-emitting diode (OLED) display, a microelectromechanical systems (MEMS) display, or an electronic paper display. The display 960 may present various content (e.g., a text, an image, a video, an icon, a symbol, or the like) to the user. The display 960 may include a touch screen, and may receive a touch, gesture, proximity or hovering input from an electronic pen or a part of a body of the user.

The communication interface 970 may set communications between the electronic device 901 and an external device (e.g., a first external electronic device 902, a second external electronic device 904, or a server 906). For example, the communication interface 970 may be connected to a network 962 via wireless communications or wired communications so as to communicate with the external device (e.g., the second external electronic device 904 or the server 906).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 964. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 901 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 962 may include at least one of telecommunications networks, for example, a computer network (e.g., local area network (LAN) or wide area network (WAN)), the Internet, or a telephone network.

The types of the first external electronic device 902 and the second external electronic device 904 may be the same as or different from the type of the electronic device 901. According to an embodiment of the present disclosure, the server 906 may include a group of one or more servers. A portion or all of operations performed in the electronic device 901 may be performed in one or more other electronic devices (e.g., the first electronic device 902, the second external electronic device 904, or the server 906). When the electronic device 901 should perform a certain function or service automatically or in response to a request, the electronic device 901 may request at least a portion of functions related to the function or service from another device (e.g., the first electronic device 902, the second external electronic device 904, or the server 906) instead of or in addition to performing the function or service for itself. The other electronic device (e.g., the first electronic device 902, the second external electronic device 904, or the server 906) may perform the requested function or additional function, and may transfer a result of the performance to the electronic device 901. The electronic device 901 may use a received result itself or additionally process the received result to provide the requested function or service. To this end, for example, a cloud computing technology, a distributed computing technology, or a client-server computing technology may be used.

Figure 10:
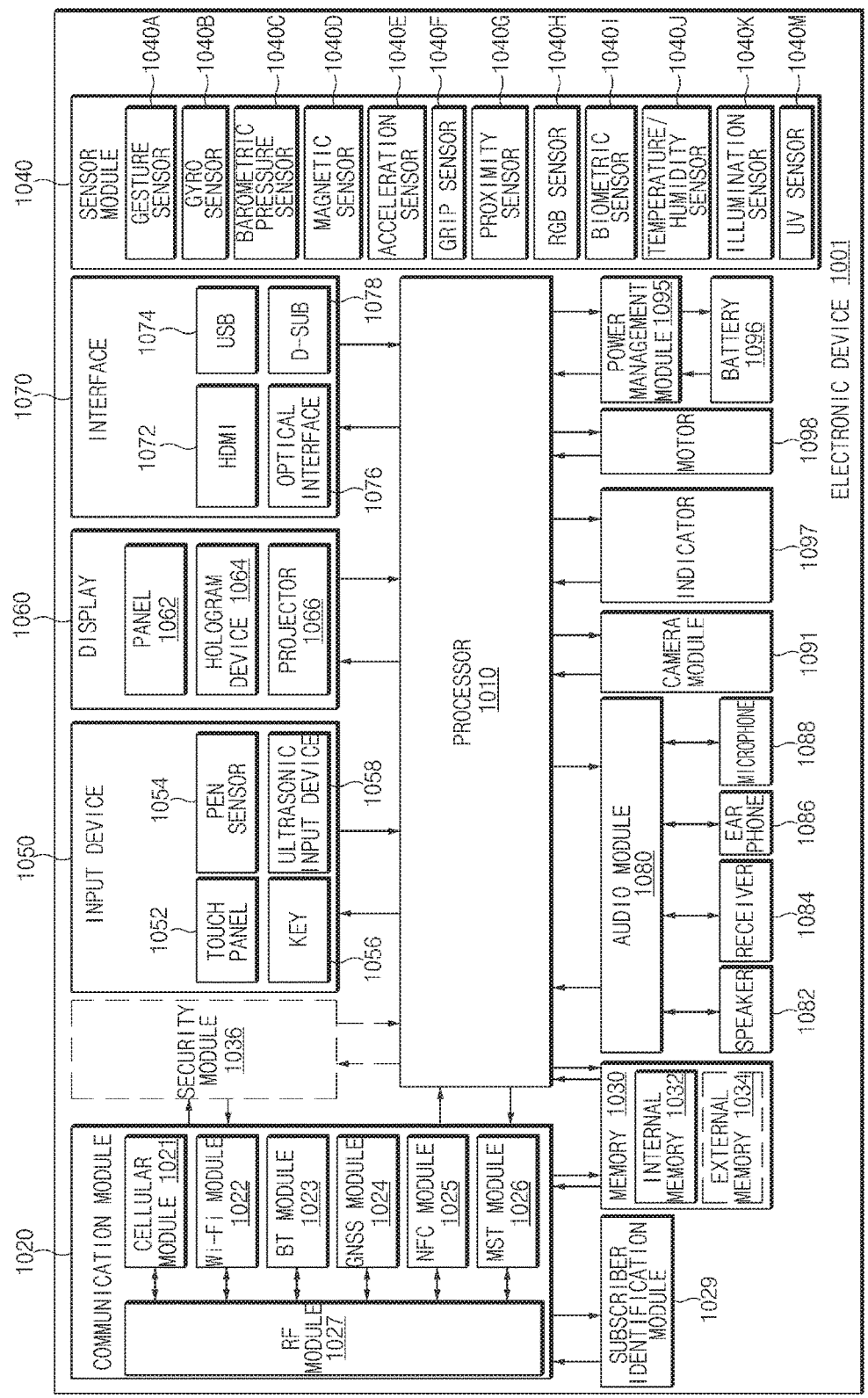
FIG. 10 is a block diagram illustrating a configuration of an electronic device according to an embodiment of the present disclosure.

FIG. 10 is a block diagram illustrating a configuration of an electronic device according to an embodiment of the present disclosure.

Referring to FIG. 10, the electronic device 1001 may include, for example, all or part of an electronic device 901 shown in FIG. 9. The electronic device 1001 may include one or more processors 1010 (e.g., application processors (APs)), a communication module 1020, a subscriber identification module (SIM) 1029, a memory 1030, a security module 1036, a sensor module 1040, an input device 1050, a display 1060, an interface 1070, an audio module 1080, a camera module 1091, a power management module 1095, a battery 1096, an indicator 1097, and a motor 1098.

The processor 1010 may drive, for example, an operating system (OS) or an application program to control a plurality of hardware or software components connected thereto and may process and compute a variety of data. The processor 1010 may be implemented with, for example, a system on chip (SoC). According to an embodiment of the present disclosure, the processor 1010 may include a graphic processing unit (GPU) (not shown) and/or an image signal processor (not shown). The processor 1010 may include at least some (e.g., a cellular module 1021) of the components shown in FIG. 10. The processor 1010 may load a command or data received from at least one of other components (e.g., a non-volatile memory) into a volatile memory to process the data and may store various data in a non-volatile memory.

The communication module 1020 may have the same or similar configuration to the communication interface 970 of FIG. 9. The communication module 1020 may include, for example, the cellular module 1021, a wireless-fidelity (Wi-Fi) module 1022, a Bluetooth (BT) module 1023, a global navigation satellite system (GNSS) module 1024 (e.g., a GPS module, a Glonass module, a Beidou module, or a Galileo module), a near field communication (NFC) module 1025, an MST module 1026, and a radio frequency (RF) module 1027.

The cellular module 1021 may provide, for example, a voice call service, a video call service, a text message service, or an Internet service, and the like through a communication network. According to an embodiment of the present disclosure, the cellular module 1021 may identify and authenticate the electronic device 1001 in a communication network using the SIM 1029 (e.g., a SIM card). According to an embodiment of the present disclosure, the cellular module 1021 may perform at least part of functions which may be provided by the processor 1010. According to an embodiment of the present disclosure, the cellular module 1021 may include a communication processor (CP).

The Wi-Fi module 1022, the BT module 1023, the GNSS module 1024, the NFC module 1025, or the MST module 1026 may include, for example, a processor for processing data transmitted and received through the corresponding module. According to various embodiments of the present disclosure, at least some (e.g., two or more) of the cellular module 1021, the Wi-Fi module 1022, the BT module 1023, the GNSS module 1024, the NFC module 1025, or the MST module 1026 may be included in one integrated chip (IC) or one IC package.

The RF module 1027 may transmit and receive, for example, a communication signal (e.g., an RF signal). Though not shown, the RF module 1027 may include, for example, a transceiver, a power amplifier module (PAM), a frequency filter, or a low noise amplifier (LNA), or an antenna, and the like. According to another embodiment of the present disclosure, at least one of the cellular module 1021, the Wi-Fi module 1022, the BT module 1023, the GNSS module 1024, the NFC module 1025, or the MST module 1026 may transmit and receive an RF signal through a separate RF module.

The SIM 1029 may include, for example, a card which includes a SIM and/or an embedded SIM. The SIM 1029 may include unique identification information (e.g., an integrated circuit card identifier (ICCID)) or subscriber information (e.g., an international mobile subscriber identity (IMSI)).

The memory 1030 (e.g., a memory 930 of FIG. 9) may include, for example, an embedded memory 1032 or an external memory 1034. The embedded memory 1032 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1034 may include a flash drive, for example, a compact flash (CF), a secure digital (SD), a micro-SD, a mini-SD, an extreme digital (xD), a multimedia car (MMC), or a memory stick, and the like. The external memory 1034 may operatively and/or physically connect with the electronic device 1001 through various interfaces.

The security module 1036 may be a module which has a relatively higher secure level than the memory 1030 and may be a circuit which stores secure data and guarantees a protected execution environment. The security module 1036 may be implemented with a separate circuit and may include a separate processor. The security module 1036 may include, for example, an embedded secure element (eSE) which is present in a removable smart chip or a removable SD card or is embedded in a fixed chip of the electronic device 1001. Also, the security module 1036 may be driven by an OS different from the OS of the electronic device 1001. For example, the security module 1036 may operate based on a java card open platform (JCOP) OS.

The sensor module 1040 may measure, for example, a physical quantity or may detect an operation state of the electronic device 1001, and may convert the measured or detected information to an electric signal. The sensor module 1040 may include at least one of, for example, a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., red, green, blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1040 may further include a control circuit for controlling at least one or more sensors included therein. According to various embodiments of the present disclosure, the electronic device 1001 may further include a processor configured to control the sensor module 1040, as part of the processor 1010 or to be independent of the processor 1010. While the processor 1010 is in a sleep state, the electronic device 1001 may control the sensor module 1040.

The input device 1050 may include, for example, a touch panel 1052, a (digital) pen sensor 1054, a key 1056, or an ultrasonic input device 1058. The touch panel 1052 may use at least one of, for example, a capacitive type, a resistive type, an infrared type, or an ultrasonic type. Also, the touch panel 1052 may further include a control circuit. The touch panel 1052 may further include a tactile layer and may provide a tactile reaction to a user.

The (digital) pen sensor 1054 may be, for example, part of the touch panel 1052 or may include a separate sheet for recognition. The key 1056 may include, for example, a physical button, an optical key, or a keypad. The ultrasonic input device 1058 may allow the electronic device 1001 to detect a sound wave using a microphone (e.g., a microphone 1088) and to verify data through an input tool generating an ultrasonic signal.

The display 1060 (e.g., a display 960 of FIG. 9) may include a panel 1062, a hologram device 1064, or a projector 1066. The panel 1062 may include the same or similar configuration to the display 960. The panel 1062 may be implemented to be, for example, flexible, transparent, or wearable. The panel 1062 and the touch panel 1052 may be integrated into one module. The hologram device 1064 may show a stereoscopic image in a space using interference of light. The projector 1066 may project light onto a screen to display an image. The screen may be positioned, for example, inside or outside the electronic device 1001. According to an embodiment of the present disclosure, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature 1078. The interface 1070 may be included in, for example, the communication interface 970 shown in FIG. 9. Additionally or alternatively, the interface 1070 may include, for example, a mobile high definition link (MHL) interface, an SD card/multimedia card (MMC) interface, or an infrared data association (IrDA) standard interface.

The audio module 1080 may convert a sound and an electric signal in dual directions. At least part of components of the audio module 1080 may be included in, for example, an input and output interface 950 (or a user interface) shown in FIG. 9. The audio module 1080 may process sound information input or output through, for example, a speaker 1082, a receiver 1084, an earphone 1086, or the microphone 1088, and the like.

The camera module 1091 may be a device which captures a still image and a moving image. According to an embodiment of the present disclosure, the camera module 1091 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1095 may manage, for example, power of the electronic device 1001. According to an embodiment of the present disclosure, though not shown, the power management module 1095 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1096 and voltage, current, or temperature thereof while the battery 1096 is charged. The battery 1096 may include, for example, a rechargeable battery or a solar battery.

The indicator 1097 may display a specific state of the electronic device 1001 or part (e.g., the processor 1010) thereof, for example, a booting state, a message state, or a charging state, and the like. The motor 1098 may convert an electric signal into mechanical vibration and may generate vibration or a haptic effect, and the like. Though not shown, the electronic device 1001 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 11:
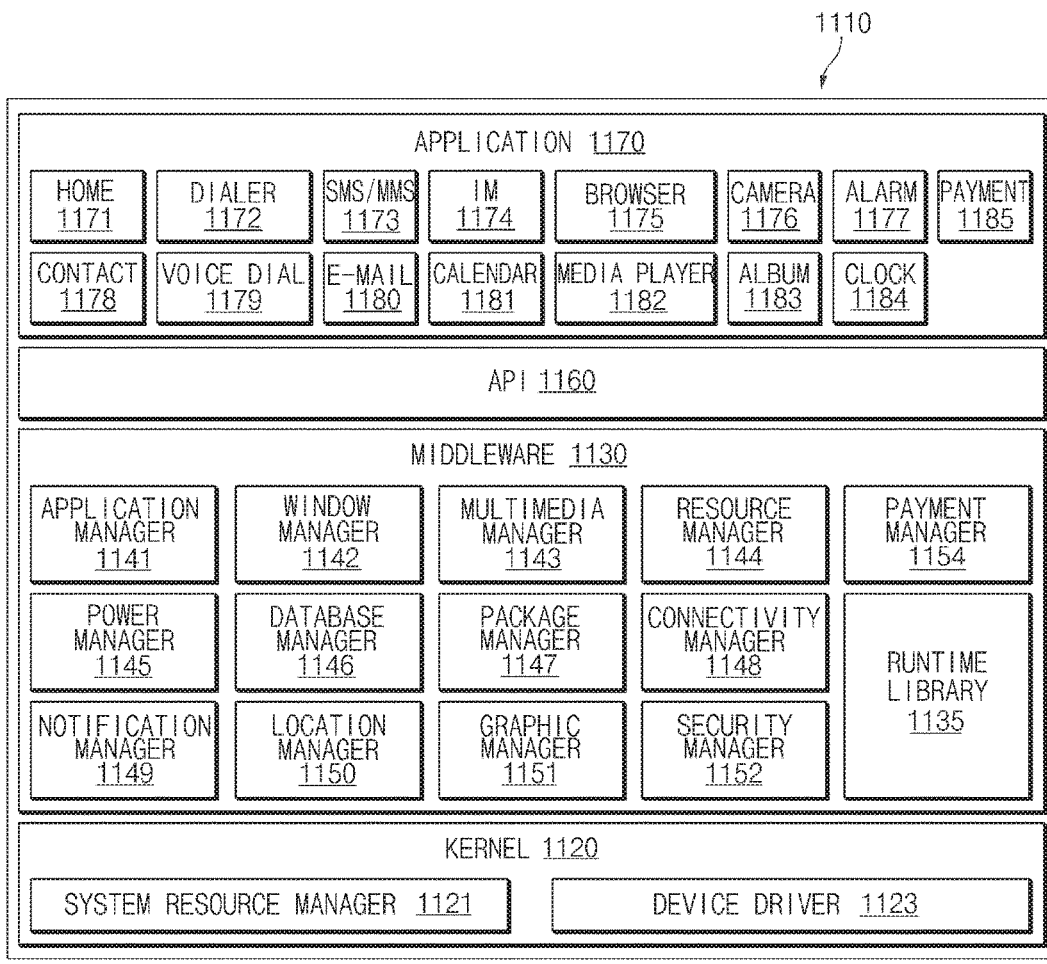
FIG. 11 is a block diagram illustrating a configuration of a program module 1110 according to an embodiment of the present disclosure.

FIG. 11 is a block diagram illustrating a configuration of a program module 1110 according to an embodiment of the present disclosure.

According to an embodiment of the present disclosure, the program module 1110 (e.g., a program 940 of FIG. 9) may include an operating system (OS) for controlling resources associated with an electronic device (e.g., an electronic device 901 of FIG. 9) and/or various applications (e.g., an application program 947 of FIG. 9) which are executed on the OS. The OS may be, for example, Android, iOS, Windows, Symbian, Tizen, or Bada, and the like.

The program module 1110 may include a kernel 1120, a middleware 1130, an application programming interface (API) 1160, and/or an application 1170. At least part of the program module 1110 may be preloaded on the electronic device, or may be downloaded from an external electronic device (e.g., a first external electronic device 902, a second external electronic device 904, or a server 906, and the like of FIG. 9).

The kernel 1120 (e.g., a kernel 941 of FIG. 9) may include, for example, a system resource manager 1121 and/or a device driver 1123. The system resource manager 1121 may control, assign, or collect, and the like system resources. According to an embodiment of the present disclosure, the system resource manager 1121 may include a process management unit, a memory management unit, or a file system management unit, and the like. The device driver 1123 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1130 (e.g., a middleware 943 of FIG. 9) may provide, for example, functions the application 1170 needs in common, and may provide various functions to the application 1170 through the API 1160 such that the application 1170 efficiently uses limited system resources in the electronic device. According to an embodiment of the present disclosure, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, a security manager 1152, or a payment manager 1154.

The runtime library 1135 may include, for example, a library module used by a compiler to add a new function through a programming language while the application 1170 is executed. The runtime library 1135 may perform a function about input and output management, memory management, or an arithmetic function.

The application manager 1141 may manage, for example, a life cycle of at least one of the application 1170. The window manager 1142 may manage graphic user interface (GUI) resources used on a screen of the electronic device. The multimedia manager 1143 may determine a format utilized for reproducing various media files and may encode or decode a media file using a codec corresponding to the corresponding format. The resource manager 1144 may manage source codes of at least one of the application 1170, and may manage resources of a memory or a storage space, and the like.

The power manager 1145 may act together with, for example, a basic input/output system (BIOS) and the like, may manage a battery or a power source, and may provide power information utilized for an operation of the electronic device. The database manager 1146 may generate, search, or change a database to be used in at least one of the application 1170. The package manager 1147 may manage installation or update of an application distributed by a type of a package file.

The connectivity manager 1148 may manage, for example, wireless connection such as Wi-Fi connection or BT connection, and the like. The notification manager 1149 may display or notify events, such as an arrival message, an appointment, and proximity notification, by a method which is not disturbed to the user. The location manager 1150 may manage location information of the electronic device. The graphic manager 1151 may manage a graphic effect to be provided to the user or a user interface (UI) related to the graphic effect. The security manager 1152 may provide some or all security functions utilized for system security or user authentication, and the like. According to an embodiment of the present disclosure, when the electronic device (e.g., an electronic device 901 of FIG. 9) has a phone function, the middleware 1130 may further include a telephony manager (not shown) for managing a voice or video communication function of the electronic device.

The middleware 1130 may include a middleware module which configures combinations of various functions of the above-described components. The middleware 1130 may provide a module which specializes according to kinds of OSs to provide a differentiated function. Also, the middleware 1130 may dynamically delete some of old components or may add new components.

The API 1160 (e.g., an API 945 of FIG. 9) may be, for example, a set of API programming functions, and may be provided with different components according to OSs. For example, in case of Android or iOS, one API set may be provided according to platforms. In case of Tizen, two or more API sets may be provided according to platforms.

The application 1170 (e.g., an application program 947 of FIG. 9) may include one or more of, for example, a home application 1171, a dialer application 1172, a short message service/multimedia message service (SMS/MMS) application 1173, an instant message (IM) application 1174, a browser application 1175, a camera application 1176, an alarm application 1177, a contact application 1178, a voice dial application 1179, an e-mail application 1180, a calendar application 1181, a media player application 1182, an album application 1183, a clock application 1184, a payment application 1185, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1170 may include an application (hereinafter, for better understanding and ease of description, referred to as "information exchange application") for exchanging information between the electronic device (e.g., the electronic device 901 of FIG. 9) and an external electronic device (e.g., the first external electronic device 902 or the second external electronic device 904). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 902 or the second external electronic device 904). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 902 or the second external electronic device 904) which communicates with the electronic device, an application which operates in the external electronic device, or a service (e.g., a call service or a message service) provided from the external electronic device.

According to an embodiment of the present disclosure, the application 1170 may include an application (e.g., the health card application of a mobile medical device) which is preset according to attributes of the external electronic device (e.g., the first external electronic device 902 or the second external electronic device 904). According to an embodiment of the present disclosure, the application 1170 may include an application received from the external electronic device (e.g., the server 906, the first external electronic device 902, or the second external electronic device 904). According to an embodiment of the present disclosure, the application 1170 may include a preloaded application or a third party application which may be downloaded from a server. Names of the components of the program module 1110 according to various embodiments of the present disclosure may differ according to kinds of OSs.

According to various embodiments of the present disclosure, at least part of the program module 1110 may be implemented with software, firmware, hardware, or at least two or more combinations thereof. At least part of the program module 1110 may be implemented (e.g., executed) by, for example, a processor (e.g., a processor 1010). At least part of the program module 1110 may include, for example, a module, a program, a routine, sets of instructions, or a process, and the like for performing one or more functions.

According to embodiments of the present disclosure, because a camera is automatically switched according to an arrangement state of a cover, image data acquired through the switched camera instead of unnecessary image data acquired through a camera covered by a cover may be output on a display.

Further, according to various embodiments of the present disclosure, because a camera is switched according to a photographing enabled state of a camera, image data may be output on a display by switching the camera to a camera in a photographing enabled state even when the camera is covered by a portion of the body of the user or another object as well as a cover.

In addition, the present disclosure may provide various effects that are directly or indirectly recognized.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 920), the processor may perform functions corresponding to the instructions. The computer-readable storage medium may be, for example, the memory 930.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a housing;
a first camera;
a second camera;
a display;
a memory;
a processor; and
at least one sensor,
wherein the processor is configured to:
displayimage data obtained through the first camera or through the second camera on the display,
analyze sensing information obtained through the at least one sensor, and to determine whether a cover is in a first arrangement state or a second arrangement state based on the analyzed sensing information, wherein the first arrangement state corresponds to a state in which the cover covers at least a part of the first camera, the second arrangement state corresponds to a state in which the cover covers at least a part of the second camera disposed on another surface of the housing,
if it is determined that the cover is in the first arrangement state, switch a photographing unit from the first camera to second camera, and terminate displaying the image data on the display, and
if it is determined the cover is in the second arrangement state, set the first camera to a photographing ready state.

2. The electronic device of claim 1, wherein the at least one sensor comprises at least one of a proximity sensor, an illumination sensor, a heat rate monitoring (HRM) sensor, and a Hall sensor.

3. The electronic device of claim 2, wherein the processor is configured to analyze a spacing distance between the proximity sensor and a portion of the cover that is obtained through the proximity sensor, and to determine whether the cover is in the first arrangement state or the second arrangement state based on the analyzed spacing distance.

4. The electronic device of claim 2, wherein the processor is configured to analyze whether an illumination intensity obtained through the illumination sensor is changed to a specific intensity or more within a specific time period, and to determine whether the cover is in the first arrangement state or the second arrangement state based on the analyzed illumination intensity.

5. The electronic device of claim 2, wherein the processor is configured to analyze a loss degree of light obtained through the HRM sensor, and to determine whether the cover is in the first arrangement state or the second arrangement state based on the analyzed loss degree of light.

6. The electronic device of claim 2, wherein the processor is configured to analyze an intensity of a magnetic field obtained through the Hall sensor, and to determine whether the cover is in the first arrangement state or the second arrangement state based on the analyzed intensity.

7. The electronic device of claim 1, wherein the processor is configured to determine whether the first camera is in a photographing enabled state in which the first camera is ready to photograph a subject, and to switch the photographing unit from the first camera to the second camera based on the determined state.

8. The electronic device of claim 7, wherein when a phase difference of light that is input through an auto focusing (AF) sensor of the first camera is a specific magnitude or less, a value of high-frequency component information or contour information extracted from an area of image data collected through the first camera is a specific size or more, or a number of colors contained in a live view or a preview obtained through the first camera is a specific value or more in a state in which elements of the first normally operate and the first camera is activated, the processor is configured to determine that the first camera is in a photographing ready state.

9. The electronic device of claim 1, wherein the cover comprises at least one of a transparent panel, a transparent display, or another display.

10. A method for switching cameras of an electronic device, the method comprising:
displaying image data obtained through a first camera or through a second camera;
analyzing sensing information obtained through at least one sensor;
determining whether a cover is in a first arrangement state or a second arrangement state based on the analyzed sensing information, wherein the first arrangement state corresponds to a state in which a cover covers at least a part of the first camera, the second arrangement state corresponds to a state in which the cover covers at least a part of the second camera disposed on another surface of the electronic device;
if it is determined that the cover is in the first arrangement state, switching a photographing unit from the first camera to the second camera and setting the second camera to a photographing ready state and terminating the displaying image data; and
if it is determined the cover is in the second arrangement state, setting the first camera to the photographing ready state.

11. The method of claim 10, wherein determining whether the cover is in the first arrangement state or the second arrangement state based on the analyzed sensing information comprises:
obtaining a spacing distance between a proximity sensor and a portion of the cover through a proximity sensor arranged on at least one surface of a housing of the electronic device;
analyzing the spacing distance; and
determining the arrangement state of the cover based on the analyzed spacing distance.

12. The method of claim 10, wherein determining whether the cover is in the first arrangement state or the second arrangement state based on the analyzed sensing information comprises:
obtaining an illumination intensity value through an illumination sensor arranged on at least one surface of a housing of the electronic device;
analyzing whether the illumination intensity value is changed to a specific size or more within a specific time period; and
determining the arrangement state of the cover based on the analyzed illumination intensity value.

13. The method of claim 10, wherein determining whether the cover is in the first arrangement state or the second arrangement state based on the analyzed sensing information comprises:
obtaining a loss degree of light through a heart rate monitoring sensor arranged on at least one surface of a housing of the electronic device;
analyzing the loss degree of the light; and
determining the arrangement state of the cover based on the analyzed loss degree of light.

14. The method of claim 10, wherein determining whether the cover is in the first arrangement state or the second arrangement state based on the analyzed sensing information comprises:
obtaining an intensity of a magnetic field through a Hall sensor arranged on at least one surface of a housing of the electronic device or at least a portion of the cover;
analyzing the intensity of the magnetic field; and
determining the arrangement state of the cover based on the analysis result.

15. The method of claim 10, wherein setting the first camera or the second camera to the photographing ready state comprises at least one of:
applying a current to an image sensor of the first camera or the second camera;
partially opening an aperture of the first camera or the second camera;
opening a shutter of the first camera or the second camera;
initializing a portion of a memory related to the first camera or the second camera; or
outputting a live view or a preview of a subject obtained through the first camera or the second camera on a display.

16. The method of claim 10, further comprising:
when the arrangement state of the cover is switched from the first arrangement state to the second arrangement state, switching the photographing unit from the second camera to the first camera and setting the first camera to the photographing enabled state.

17. The method of claim 10, further comprising:
determining whether the first camera is in a photographing enabled state in which the first camera is ready to photograph a subject, in response to a request signal that requests the first camera to be set to the photographing ready state;
when the first camera is in a photographing disenabled state, switching the photographing unit from the first camera to the second camera and setting the second camera to the photographing ready state; and
when the first camera is in the photographing enabled state, setting the first camera to the photographing ready state.

18. The method of claim 17, wherein determining the photographing enabled state comprises:
when a phase difference of light that is input through an auto focusing (AF) sensor of the first camera is a specific magnitude or less, a value of high-frequency component information or contour information extracted from an area of image data collected through the first camera is a specific size or more, or a number of colors contained in a live view or a preview obtained through the first camera is a specific value or more in a state in which elements of the first camera are normally operated and the first camera is activated, determining that the first camera is in the photographing enabled state.

19. The method of claim 17, wherein when the first camera is switched from the photographing disenabled state to the photographing enabled state, switching the photographing unit from the second camera to the first camera and setting the first camera to the photographing enabled state.

* * * * *